United States Patent
Abotabl et al.

(10) Patent No.: US 12,526,742 B2
(45) Date of Patent: Jan. 13, 2026

(54) SIDELINK COMMUNICATION TECHNIQUES BASED ON NETWORK LINK ENERGY SAVINGS MODES

(71) Applicant: QUALCOMM Incorporated, San Diego, CA (US)

(72) Inventors: Ahmed Attia Abotabl, San Diego, CA (US); Marwen Zorgui, San Diego, CA (US); Wanshi Chen, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 18/112,139

(22) Filed: Feb. 21, 2023

(65) Prior Publication Data

US 2024/0284325 A1    Aug. 22, 2024

(51) Int. Cl.
*H04W 52/02* (2009.01)
*H04W 72/40* (2023.01)

(52) U.S. Cl.
CPC ....... *H04W 52/0212* (2013.01); *H04W 72/40* (2023.01)

(58) Field of Classification Search
CPC .............. H04L 5/001; H04W 52/0206; H04W 52/0212; H04W 52/0216; H04W 52/0235; H04W 72/0453; H04W 72/40; H04W 76/14; H04W 92/18
See application file for complete search history.

(56) References Cited

U.S. PATENT DOCUMENTS

| | | | | |
|---|---|---|---|---|
| 2018/0183551 A1* | 6/2018 | Chou | ...................... | H04L 5/001 |
| 2019/0306923 A1* | 10/2019 | Xiong | ................... | H04L 27/261 |
| 2021/0212099 A1 | 7/2021 | Yi et al. | | |
| 2022/0210739 A1 | 6/2022 | Yi et al. | | |
| 2023/0189347 A1* | 6/2023 | Xiong | ............... | H04W 74/0891 |
| | | | | 370/329 |

OTHER PUBLICATIONS

International Search Report and Written Opinion—PCT/US2024/013127—ISA/EPO—Jun. 10, 2024.
(Continued)

*Primary Examiner* — Phuc H Tran
(74) *Attorney, Agent, or Firm* — Dalei Dong; Holland & Hart LLP

(57) ABSTRACT

Methods, systems, and devices for wireless communications are described that provide for a user equipment (UE) with concurrent sidelink and network link connections to operate the sidelink connection in accordance with a configured behavior associated with a bandwidth part (BWP) operation mode on the network link. The UE behavior may include, for example, no impact on sidelink activity when the network link is in a dormant or network energy saving (NES) mode, discontinuation of sidelink operation when the BWP is configured with a dormant or NES operation mode, or sidelink operation only in an identified sidelink mode when the BWP is configured with a dormant or NES operation mode. The sidelink operation mode based on NES mode of a network link BWP may be signaled to the UE on a per-BWP basis, or based on configuration and separate indication when a BWP is enabled.

30 Claims, 19 Drawing Sheets

(56) References Cited

OTHER PUBLICATIONS

VIVO: "Correction on Dedicated Mode-1 Discovery Transmission Pool in TS 38.331", 3GPP TSG-RAN WG2 Meeting #120, R2-2211671, 3rd Generation Partnership Project, Mobile Competence Centre, 650, Route Des Lucioles, F-06921, Sophia-Antipolis Cedex, France, vol. 3GPP RAN 2, No. Toulouse, FR, Nov. 14, 2022-Nov. 18, 2022, Nov. 4, 2022, 11 Pages, XP052215775.

* cited by examiner

Resource Pool Indication 220

Sidelink Communication Configuration Information 225

SCI 230

Sidelink Message 235

SIDELINK COMMUNICATION TECHNIQUES BASED ON NETWORK LINK ENERGY SAVINGS MODES

FIELD OF TECHNOLOGY

The following relates to wireless communications, including sidelink communication techniques based on network link energy savings modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may communicate with one or more network entities via one or more network links (e.g., via a Uu interface). In some systems, one or more UEs also may communicate directly with one or more other UEs via one or more sidelinks (e.g., via a PC5 interface). Efficient techniques for coordinating and scheduling network link and sidelink communications may help to enhance the efficiency and reliability in wireless communications.

SUMMARY

The described techniques relate to improved methods, systems, devices, and apparatuses that support sidelink communication techniques based on network link energy savings modes. For example, the described techniques provide for a user equipment (UE) with concurrent sidelink (e.g., via a PC5 interface) and network link (e.g., via a Uu interface) connections to operate the sidelink connection in accordance with a configured behavior associated with a bandwidth part (BWP) operation mode on the network link. In some cases, the UE behavior may include, for example, no impact on sidelink activity when the network link is in a dormant or network energy saving (NES) mode, discontinuation of sidelink operation when the BWP is configured with a dormant or NES operation mode, or sidelink operation only in an identified sidelink mode (e.g. sidelink mode 2 in which sidelink resource allocations are made by sidelink devices) when the BWP is configured with a dormant or NES operation mode. The sidelink operations based on NES mode of a network link BWP may be signaled to the UE on a per-BWP basis, or based on configuration and separate indication when a BWP is enabled. In some cases, BWPs may be configured per component carrier, and whether a particular component carrier has an impact on sidelink operation may be signaled with configuration information for each component carrier.

A method for wireless communication at a user equipment (UE) is described. The method may include communicating with a network entity via a first link that includes one or more bandwidth parts, a network energy mode being associated with the one or more bandwidth parts, identifying a first sidelink operation mode of a set of available sidelink operation modes of a second link that provides sidelink communications with one or more other UEs, the first sidelink operation mode based on the network energy mode, and communicating with the one or more other UEs via the second link in accordance with the first sidelink operation mode.

An apparatus for wireless communication at a UE is described. The apparatus may include a processor, memory coupled with the processor, and instructions stored in the memory. The instructions may be executable by the processor to cause the apparatus to communicate with a network entity via a first link that includes one or more bandwidth parts, a network energy mode being associated with the one or more bandwidth parts, identify a first sidelink operation mode of a set of available sidelink operation modes of a second link that provides sidelink communications with one or more other UEs, the first sidelink operation mode based on the network energy mode, and communicate with the one or more other UEs via the second link in accordance with the first sidelink operation mode.

Another apparatus for wireless communication at a UE is described. The apparatus may include means for communicating with a network entity via a first link that includes one or more bandwidth parts, a network energy mode being associated with the one or more bandwidth parts, means for identifying a first sidelink operation mode of a set of available sidelink operation modes of a second link that provides sidelink communications with one or more other UEs, the first sidelink operation mode based on the network energy mode, and means for communicating with the one or more other UEs via the second link in accordance with the first sidelink operation mode.

A non-transitory computer-readable medium storing code for wireless communication at a UE is described. The code may include instructions executable by a processor to communicate with a network entity via a first link that includes one or more bandwidth parts, a network energy mode being associated with the one or more bandwidth parts, identify a first sidelink operation mode of a set of available sidelink operation modes of a second link that provides sidelink communications with one or more other UEs, the first sidelink operation mode based on the network energy mode, and communicate with the one or more other UEs via the second link in accordance with the first sidelink operation mode.

In some examples of the method, apparatuses, and non-transitory computer-readable medium described herein, the identifying may include operations, features, means, or instructions for receiving an indication that a first bandwidth part is activated for communications on the first link, the first bandwidth part having an associated first network energy mode, and at least a second bandwidth part has an associated second network energy mode that is different than the first network energy mode, and identifying the first sidelink operation mode that is associated with the first network energy mode based on the activation of the first bandwidth part, and a second sidelink operation mode of the set of available sidelink operation modes is associated with the second network energy mode. In some examples of the method, apparatuses, and non-transitory computer-readable medium described herein, the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

Some examples of the method, apparatuses, and non-transitory computer-readable medium described herein may further include operations, features, means, or instructions for receiving an indication that the first link has a changed bandwidth part that is associated with a different network energy mode, identifying a second sidelink operation mode of the set of available sidelink operation modes based on the changed bandwidth part, and communicating with the one or more other UEs via the second link in accordance with the second sidelink operation mode. In some examples of the method, apparatuses, and non-transitory computer-readable medium described herein, a first bandwidth part of the one or more bandwidth parts indicates an energy saving mode associated with the first link, and a second bandwidth part of the one or more bandwidth parts indicates a regular network energy mode associated with the first link.

Some examples of the method, apparatuses, and non-transitory computer-readable medium described herein may further include operations, features, means, or instructions for receiving configuration information that indicates the one or more bandwidth parts of the first link and an associated sidelink operation mode of the set of sidelink operation modes for each of the one or more bandwidth parts. In some examples of the method, apparatuses, and non-transitory computer-readable medium described herein, a first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications with the one or more UEs when the first link uses the first bandwidth part, and the second sidelink operation mode is used for sidelink communications with the one or more UEs when the first link uses the second bandwidth part.

In some examples of the method, apparatuses, and non-transitory computer-readable medium described herein, the receiving the configuration information may include operations, features, means, or instructions for receiving a first information element associated with the first bandwidth part that indicates a first network energy mode and the first sidelink operation mode and receiving a second information element associated with the second bandwidth part that indicates a second network energy mode and the second sidelink operation mode.

Some examples of the method, apparatuses, and non-transitory computer-readable medium described herein may further include operations, features, means, or instructions for receiving configuration information that indicates the set of sidelink operation modes, and a selected sidelink operation mode is indicated from the set of sidelink operation modes. In some examples of the method, apparatuses, and non-transitory computer-readable medium described herein, the selected sidelink operation mode is indicated with the configuration information, or is dynamically indicated with signaling that activates the bandwidth part for communications using the first link.

In some examples of the method, apparatuses, and non-transitory computer-readable medium described herein, the first link includes two or more component carriers, and where the first sidelink operation mode based on the network energy mode associated with the one or more bandwidth parts of a first component carrier of the two or more component carriers. Some examples of the method, apparatuses, and non-transitory computer-readable medium described herein may further include operations, features, means, or instructions for receiving configuration information for the two or more component carriers, the configuration information indicating whether an associated component carrier is linked to the set of sidelink operation modes. In some examples of the method, apparatuses, and non-transitory computer-readable medium described herein, the configuration information associated with each component carrier includes an information element with a Boolean value that indicates whether or not a corresponding component carrier is linked to the set of sidelink operation modes.

A method for wireless communication at a network entity is described. The method may include communicating with a first UE via a first link that includes one or more bandwidth parts, a network energy mode being associated with the one or more bandwidth parts and configuring the first UE with a set of available sidelink operation modes for a second link that provides sidelink communications for the first UE and one or more other UEs, a first sidelink operation mode of the set of available sidelink operation modes associated with the network energy mode.

An apparatus for wireless communication at a network entity is described. The apparatus may include a processor, memory coupled with the processor, and instructions stored in the memory. The instructions may be executable by the processor to cause the apparatus to communicate with a first UE via a first link that includes one or more bandwidth parts, a network energy mode being associated with the one or more bandwidth parts and configure the first UE with a set of available sidelink operation modes for a second link that provides sidelink communications for the first UE and one or more other UEs, a first sidelink operation mode of the set of available sidelink operation modes associated with the network energy mode.

Another apparatus for wireless communication at a network entity is described. The apparatus may include means for communicating with a first UE via a first link that includes one or more bandwidth parts, a network energy mode being associated with the one or more bandwidth parts and means for configuring the first UE with a set of available sidelink operation modes for a second link that provides sidelink communications for the first UE and one or more other UEs, a first sidelink operation mode of the set of available sidelink operation modes associated with the network energy mode.

A non-transitory computer-readable medium storing code for wireless communication at a network entity is described. The code may include instructions executable by a processor to communicate with a first UE via a first link that includes one or more bandwidth parts, a network energy mode being associated with the one or more bandwidth parts and configure the first UE with a set of available sidelink operation modes for a second link that provides sidelink communications for the first UE and one or more other UEs, a first sidelink operation mode of the set of available sidelink operation modes associated with the network energy mode.

Some examples of the method, apparatuses, and non-transitory computer-readable medium described herein may further include operations, features, means, or instructions for transmitting an indication that a first bandwidth part is activated for communications with the first UE on the first link, the first bandwidth part having an associated first network energy mode, and at least a second bandwidth part having an associated second network energy mode that is different than the first network energy mode, where the first sidelink operation mode is associated with the first network energy mode based on the activation of the first bandwidth part, and a second sidelink operation mode of the set of available sidelink operation modes is associated with the second network energy mode based on activation of the second bandwidth part. In some examples of the method, apparatuses, and non-transitory computer-readable medium described herein, the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

Some examples of the method, apparatuses, and non-transitory computer-readable medium described herein may further include operations, features, means, or instructions for transmitting an indication to the first UE that the first link has a changed bandwidth part that is associated with a different network energy mode, where a second sidelink operation mode of the set of available sidelink operation modes is associated with the changed bandwidth part and sidelink communications via the second link are in accordance with the second sidelink operation mode responsive to the indication that the first link has the changed bandwidth part. In some examples of the method, apparatuses, and non-transitory computer-readable medium described herein, a first bandwidth part of the one or more bandwidth parts indicates an energy saving mode associated with the first link, and a second bandwidth part of the one or more bandwidth parts indicates a regular network energy mode associated with the first link.

Some examples of the method, apparatuses, and non-transitory computer-readable medium described herein may further include operations, features, means, or instructions for transmitting configuration information to the first UE that indicates the one or more bandwidth parts of the first link and an associated sidelink operation mode of the set of sidelink operation modes for each of the one or more bandwidth parts. In some examples of the method, apparatuses, and non-transitory computer-readable medium described herein, a first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications among the UEs when the first link uses the first bandwidth part, and the second sidelink operation mode is used for sidelink communications among the UEs when the first link uses the second bandwidth part.

Some examples of the method, apparatuses, and non-transitory computer-readable medium described herein may further include operations, features, means, or instructions for transmitting configuration information that indicates the set of sidelink operation modes, and a selected sidelink operation mode is indicated from the set of sidelink operation modes. In some examples of the method, apparatuses, and non-transitory computer-readable medium described herein, the selected sidelink operation mode is indicated with the configuration information, or is dynamically indicated with signaling that activates the bandwidth part for communications using the first link. In some examples of the method, apparatuses, and non-transitory computer-readable medium described herein, the first link includes two or more component carriers, and where the first sidelink operation mode based on the network energy mode associated with the one or more bandwidth parts of a first component carrier of the two or more component carriers. Some examples of the method, apparatuses, and non-transitory computer-readable medium described herein may further include operations, features, means, or instructions for transmitting configuration information for the two or more component carriers, the configuration information indicating whether an associated component carrier is linked to the set of sidelink operation modes.

DETAILED DESCRIPTION

Figure 1:
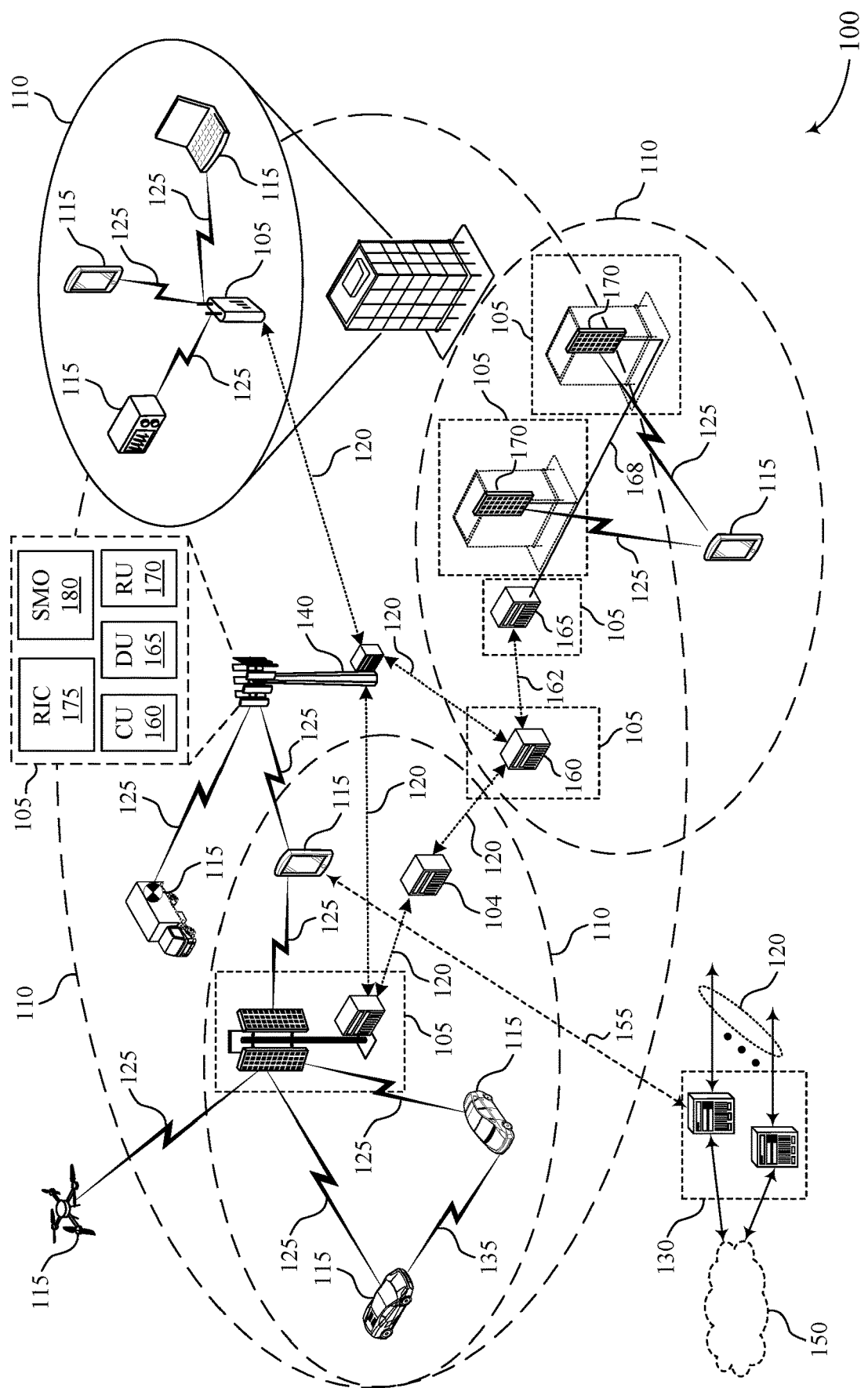
FIG. 1 illustrates an example of a wireless communications system that supports sidelink communication techniques based on network link energy savings modes in accordance with one or more aspects of the present disclosure.

A wireless communications system may include a communication device, such as a user equipment (UE) or a network entity (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, 5G systems (which may be referred to as NR systems), 6G systems, or other radio access technologies. The wireless communications may include uplink transmission, uplink reception, downlink transmission, or downlink reception, sidelink transmission, sidelink reception, or a combination thereof. A communication device may be configured with various circuitry to support wireless communications. In some cases, this various circuitry may include multiple circuit elements, such as multiple transmit/receive chains that each have associated power amplifier, mixer, and filtering components, among others, for example. When transmitting via multiple antenna ports, multiple active transmit chains may consume relatively large amounts of power.

In some cases, network entities may have relatively large energy consumption that may be driven in part by a relatively large number of antennas at a network entity (e.g., gNBs, radio heads, etc.). For example, if a network entity uses all of its antennas, energy consumption can increase by a relatively large amount relative to cases where fewer than all antennas are used for communications. In some cases, one or more network energy saving (NES) modes may be implemented in which network power savings may be achieved by using fewer than all of the antennas at a network-side transmitter (e.g., by using 16 antenna ports instead of 32 antenna ports at a network entity for wireless communications), or by moving one or more bandwidth parts (BWPs) of a communications bandwidth to an NES mode or dormant mode in which communications are discontinued. In cases where a UE may be configured for sidelink communications, sidelink operation and configuration may be impacted by a NES operation associated with a corresponding network link. For example, if the network transitions into a sleep or dormant mode for a BWP, the network entity may be unable to provide grants of sidelink resources, or may be unable to reconfigure or release a configured sidelink grant. Thus, efficient techniques to configure and indicate a network link operation mode and sidelink behavior associated with different network link operation modes may be desirable in order to reduce network power consumption through switching to different NES operation modes, while also providing corresponding sidelink operation modes.

In accordance with some aspects, a network entity may provide signaling that indicates different sidelink operation modes that are associated with one or more operation modes of a network link. In some aspects, techniques provide for a UE with concurrent sidelink (e.g., via a PC5 interface) and network link (e.g., via a Uu interface) connections to operate the sidelink connection in accordance with a configured behavior associated with a BWP operation mode on the network link. In some cases, the UE behavior may include, for example, no impact on sidelink activity when the network link is in a dormant or NES operation mode, discontinuation of sidelink operation when the BWP is configured with a dormant or NES operation mode, or sidelink operation only in an identified sidelink mode (e.g. sidelink mode 2 in which sidelink resource allocations are made by sidelink devices) when the BWP is configured with a dormant or NES operation mode. The sidelink operations based on NES operation mode of a network link BWP may be signaled to the UE on a per-BWP basis, or based on configuration and separate indication when a BWP is enabled. In some cases, BWPs may be configured per component carrier, and whether a particular component carrier has an impact on sidelink operation may be signaled with configuration information for each component carrier.

Techniques as discussed herein may provide for enhanced flexibility in selection of operating modes for network links at a network entity, while also providing corresponding sidelink behavior. In some cases, such techniques may allow network entities to reduce operating power, while providing flexible and efficient techniques to indicate operation modes to served devices.

Aspects of the disclosure are initially described in the context of wireless communications systems. Aspects of the disclosure are further illustrated by and described with reference to process flows, apparatus diagrams, system diagrams, and flowcharts that relate to sidelink communication techniques based on network link energy savings modes.

FIG. 1 illustrates an example of a wireless communications system 100 that supports sidelink communication techniques based on network link energy savings modes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support sidelink communication techniques based on network link energy savings modes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, one or more network entities 105 may operate in accordance with one or more NES modes (e.g., using fewer than all available antennas, setting one or more BWPs to a dormant state, or any combinations thereof). In cases where a network entity 105 uses one or more NES modes, and one or more served UEs 115 have a concurrent sidelink and network link connections, techniques as discussed herein may provide that the UEs 115 operate the sidelink connection in accordance with a configured behavior associated with a BWP operation mode on the network link. In some cases, the UE 115 behavior may include, for example, no impact on sidelink activity when the network link is in a dormant or NES mode, discontinuation of sidelink operation when the BWP is configured with a dormant or NES operation mode, or sidelink operation only in an identified sidelink mode (e.g., sidelink mode 2) when the BWP is configured with a dormant or NES operation mode. The sidelink operations based on NES mode of a network link BWP may be signaled to one or more UEs 115 on a per-BWP basis, or based on configuration and separate indication when a BWP is enabled. In some cases, BWPs may be configured per component carrier, and whether a particular component carrier has an impact on sidelink operation may be signaled with configuration information for each component carrier.

Figure 2:
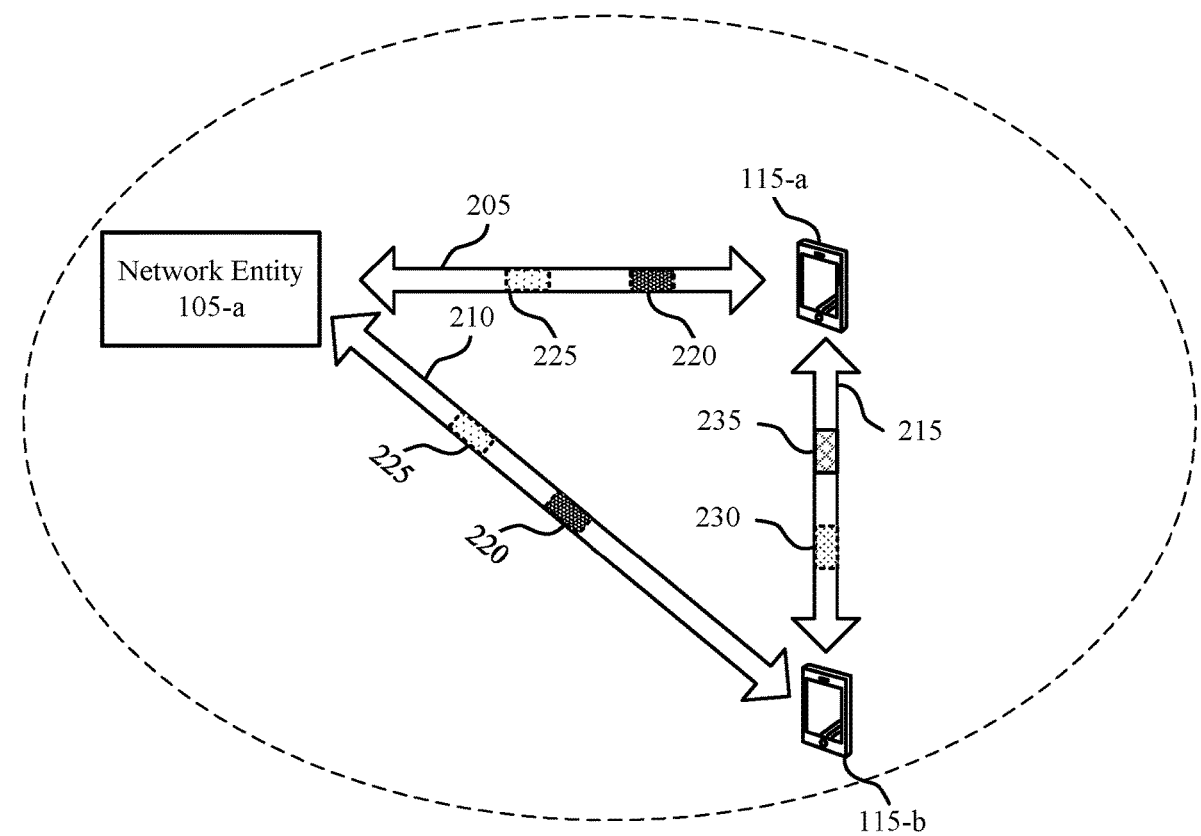
FIG. 2 illustrates an example of a wireless communications system that supports sidelink communication techniques based on network link energy savings modes in accordance with one or more aspects of the present disclosure.
Figure 2:
Figure 2:
Figure 2:
Figure 2:

FIG. 2 illustrates an example of a wireless communications system 200 that supports sidelink communication techniques based on network link energy savings modes in accordance with one or more aspects of the present disclosure. The wireless communications system 200 may implement or be implemented by aspects of the wireless communications system 100 as described in FIG. 1. For example, the wireless communications system 200 may include a network entity 105-a, a first UE 115-a, and a second UE 115-b, which may be examples of network entities 105 and UEs 115 as described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support power saving, and, in some examples, may promote wireless communications in which operation modes of the network entity 105-a may be selected based at least in part on power consumption considerations, and sidelink operation modes may be based at least in part on the operation mode of the network entity 105-a.

One or more of the network entity 105-a or the UEs 115, or any combination thereof, may be equipped with multiple antennas, which may be used to employ techniques as described with reference to FIG. 1. The antennas of one or more of the network entity 105-a or the UEs 115, or any combination thereof, may be located within one or more antenna arrays or antenna panels, which may support operations as described herein. The network entity 105-a may have an antenna array with a number of rows and columns of antenna ports that the network entity 105-a may use to support wireless communications (e.g., with UEs 115). Likewise, the first UE 115-a and the second UE 115-b may have one or more antenna arrays that may support various operations as described herein.

In the example of FIG. 2, the first UE 115-a and network entity 105-a may communicate via at least a first link 205 using a first operation mode (e.g., a first NES mode). Similarly, the second UE 115-b and the network entity 105-a may communicate via at least a second link 210 using the first operation mode (e.g., the first NES mode). The first link 205 and the second link 210 may be examples of network links (e.g., via a Uu interface). In some cases, the first link 205 and the second link 210 may use one or more BWPs, and the first NES mode may be associated with the one or more BWPs. In this example, the first UE 115-a and the second UE 115-b may also communicate via sidelink connection 215 (e.g., via a PC5 interface). In some cases, the network entity 105-a may convey configuration information to the first UE 115-a and the second UE 115-b related to UE operation when a network link is dormant or operating in an NES mode. For example, the network entity 105-a may provide a sidelink resource pool indication 220, that indicates a set of resources that are configured for sidelink communications. The network entity 105-a may also provide sidelink communication configuration information 225, which may indicate a mode of sidelink operation (e.g., mode 1 in which the network entity 105-a provides resource grants, or mode 2 in which a sidelink device may determine resource grants from within the configured sidelink resource pool). The first UE 115-a and the second UE 115-b may communicate sidelink control information (SCI) 230, and one or more sidelink messages 235, via the sidelink connection 215.

As discussed herein, in some cases the network entity 105-a may indicate that a BWP associated with first link 205, second link 210, or both, are in a power saving mode, such as a dormant mode or NES mode that has reduced power consumption. The first UE 115-a and the second UE 115-b may determine, based at least in part on a network link configuration (e.g., via RRC configuration), which downlink BWP among the UE-specific RRC configured BWPs is the dormant BWP or is operating in a NES mode. In cases where a BWP is in a dormant state, served UEs may discontinue monitoring for control information (e.g., via physical downlink control channel (PDCCH) communications) on an associated SCell, but continue performing channel state information (CSI) measurements, and automatic gain control (AGC) and beam management if configured. In some cases, periodic and semi-persistent CSI reporting are supported, but aperiodic CSI reporting is not supported for a SCell having a dormant BWP. Further, UEs may discontinue monitoring the PDCCH for the SCell (e.g., for cross-carrier scheduling) when the scheduled SCell is in dormancy. In some cases, beam failure recovery (BFR) and beam failure detection (BFD) in a dormant SCell may be allowed, in which BFD can be configured and performed in dormancy SCell, and BFR indication (in form of a scheduling request (SR)) can be sent in any available serving cell except the SCell with dormant BWP. Additionally, in some cases only TCI state may be configured in a physical downlink shared channel (PDSCH) configuration for the SCell with dormant BWP (e.g., configuration information other than TCI state is not applied for a SCell with dormant BWP. For uplink transmissions, sounding reference signal (SRS) transmissions, including aperiodic SRS, semi-periodic SRS and periodic SRS, may be discontinued when the downlink BWP is switched to dormant BWP. Further, UEs 115 may discontinue all uplink communications when the downlink BWP is switched to dormant BWP (e.g., UEs 115 stop any uplink transmission, suspend any configured uplink grants Type 1, and clear any configured uplink grant of configured grant Type 2 in the dormancy SCell).

In some cases, sidelink operation and configuration may be impacted by the network energy saving operation of a network link. For example, if the network entity 105-a transitions into a sleep mode (e.g., the BWP used for network links transitions to a dormancy state), the network entity 105-a might not transmit any sidelink mode-1 dynamic grants, or it may not reconfigure or release a configured sidelink grant. In accordance with various aspects discussed herein, a dormant BWP, or a set of dormant BWPs, may be configured to provide different network link and sidelink operations based on different network link operation modes (e.g., NES or dormant BWP states). In some cases, UEs 115 may expect to be configured to behave according to one of a number of different behaviors. A first behavior may be that a dormant or NES operation mode for a network link will have no impact on sidelink activity. It is noted that under this behavior, sidelink mode-1 random access may be impacted because DCI may not be monitored from the network entity 105-a. A second behavior may be that a BWP that is configured to support energy saving operating modes, when in regular downlink/uplink behavior, will have no sidelink activity (e.g., communications via sidelink connection 215 are discontinued on such a BWP). In this mode, for the BWP, the UEs 115 follow established network link behavior but stop all sidelink activity. A third behavior may be that a dormant or NES operation mode for a network link indicates that all sidelink activity is to be discontinued. Operation according to this behavior may provide that the UEs 115 follows low-level activity as defined by the dormancy behavior of the network link, and discontinues the sidelink activity. A fourth behavior may be that, for regular downlink/uplink, only sidelink mode-2 operation is performed. In this mode, the UEs 115 follow the non-dormant behavior in the network link and stop sidelink mode-1 operations.

In some cases, the UE 115 behavior for different network link operating modes may be signaled by the network entity 105-a. In some cases, configuration information from the network entity 105-a may indicate UE 115 behavior for network link BWPs that may operate in one or more dormancy or NES modes. For example, a "Uu-SL dormant/NES BWP" may be defined for each behavior and the UEs 115 adopt this behavior when the corresponding network link BWP is activated. For example, each UE 115 may receive (e.g., via RRC signaling, a medium access control (MAC) control element, downlink control information, or any combinations thereof) an information element (IE) that defines UE behavior for the network link and the sidelink. For example a first BWP may have an IE that indicates dormant_Uu_and_dormant_SL (e.g., the third behavior as discussed previously), while a second BWP may have an IE that indicates non_dormant_Uu_and_dormant_SL (e.g., the second behavior as discussed previously). In other cases, multiple behaviors may be defined under one "Uu-SL dormant/NES BWP" and the UEs 115 may adopt one of them when the Uu-SL dormant/NES BWP is the active BWP. The specific behavior may be RRC configured under the Uu-SL dormant/NES BWP, or dynamically indicated during the activation of the BWP. For example, a DCI scheduling PDSCH/PUSCH may have one extra bit that indicates the operation in the network link and in Sidelink (e.g., 00 indicates that the network link is transitioning into an NES state while the sidelink may continue activity as normal).

Additionally, or alternatively, because BWPs may be configured per component carrier, the BWPs associated with network operation modes may be configured under a specific component carrier. This component carrier may be RRC configured with an IE that enables the connection between network link operation and sidelink operation as discussed herein. For example, in accordance with a component carrier configuration, there may be an IE that is Boolean in value, in which 0 indicates that there is no link between the BWPs in this component carrier and sidelink operation, and in which 1 indicates that there is a link between the BWPs in this component carrier and sidelink operation (e.g., no sidelink activity when the BWP is configured to have different network energy modes).

Figure 3:
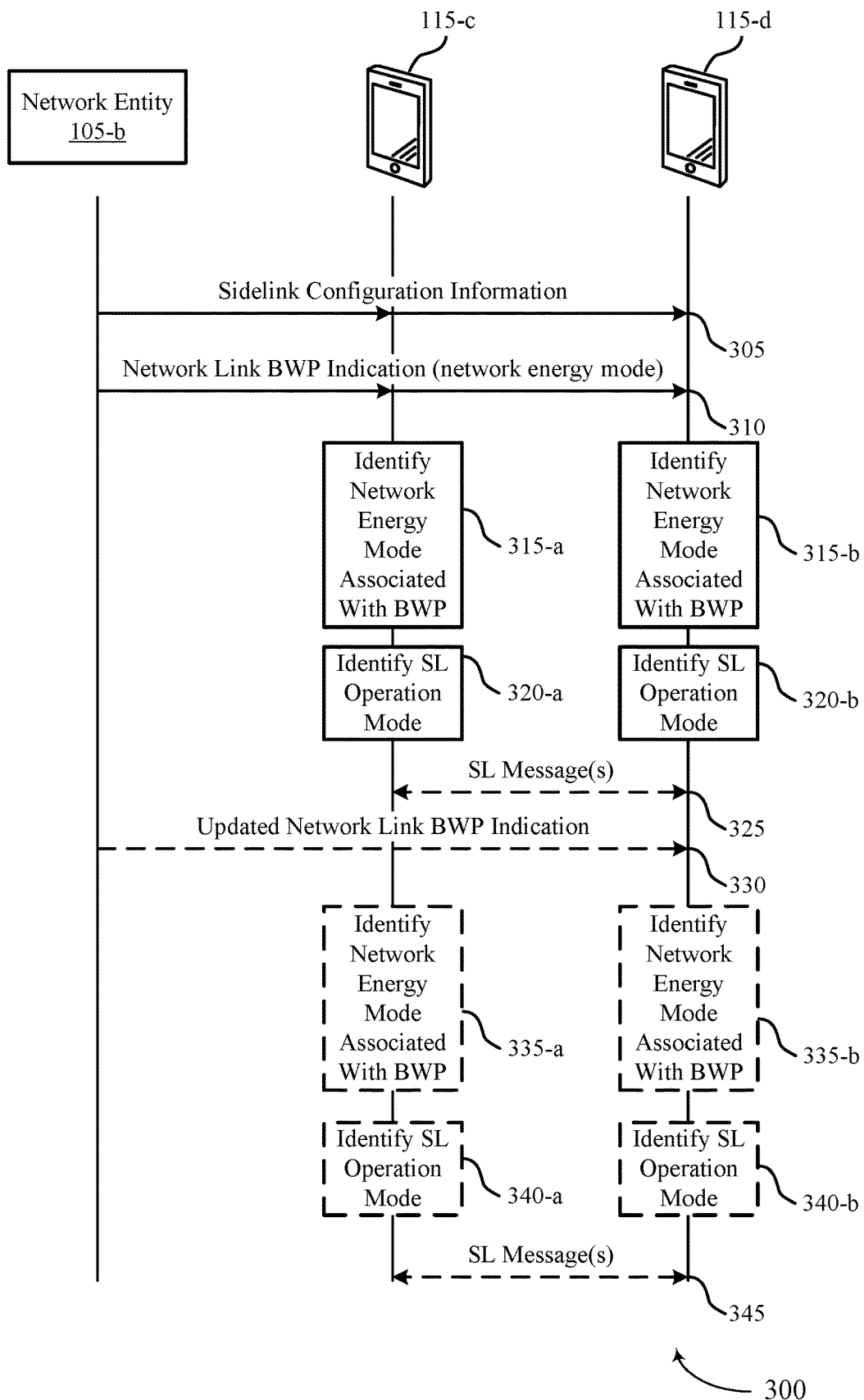
FIG. 3 illustrates an example of a process flow that supports sidelink communication techniques based on network link energy savings modes in accordance with one or more aspects of the present disclosure.

FIG. 3 illustrates an example of a process flow 300 that supports sidelink communication techniques based on network link energy savings modes in accordance with one or more aspects of the present disclosure. In some examples, the process flow 300 may implement or be implemented by aspects of UEs and network entities as described with reference to FIGS. 1 and 2. For example, the process flow 300 may be implemented by a network entity 105-b, a first UE 115-c, and a second UE 115-d, which may be examples of a network entity 105 and a UE 115 as described with reference to FIGS. 1 and 2. The process flow 300 may be implemented by the network entity 105-b and the UEs 115 to exchange signaling to promote network entity power saving and reliable communications between one or more of the network entity 105-b and the UEs 115, and between the first UE 115-c and the second UE 115-d via sidelink communications. In the following description of the process flow 300, the operations between the network entity 105-b, the first UE 115-c, and the second UE 115-d, may be transmitted in a different order than the example order shown, or the operations performed by the network entity 105-b, the first UE 115-c, and the second UE 115-d, may be performed in different orders or at different times. Some operations may also be omitted from the process flow 300, and other operations may be added to the process flow 300.

At 305, the network entity 105-b may determine sidelink configuration information and transmit the sidelink configuration information to the first UE 115-c and the second UE 115-d. While various examples discussed herein show a network entity 105 communicating with multiple UEs 115 that may be in sidelink communications, techniques as discussed herein may be implemented in cases where a network entity 105 communicates with one sidelink UE 115, which may then relay information to a different sidelink UE 115 that may not have a network link with the network entity 105. In some cases, the sidelink configuration information may indicate a sidelink resource pool, a sidelink operation mode (e.g., sidelink mode-1 or sidelink mode-2), and UE 115 behavior for different network energy modes that may be used for the network link between the network entity 105-b and one or more of the first UE 115-c and the second UE 115-d.

At 310, the network entity may transmit a network link BWP indication to one or both of the first UE 115-c or the second UE 115-d. The network link BWP indication may indicate a network energy mode for the BWP for the associated network link, that may indicate the BWP is transitioning to a dormancy state or other NES state. At 315-a, the first UE 115-c may identify the network energy mode, and at 315-b the second UE 115-d may identify the network energy mode. At 320-a, the first UE 115-c may identify the associated sidelink operation mode based on the indicated network energy mode and the configured sidelink behavior associated with the network energy mode. Similarly, at 320-b, the second UE 115-d may identify the associated sidelink operation mode based on the indicated network energy mode and the configured sidelink behavior associated with the network energy mode. At 325, the first UE 115-c and the second UE 115-d may exchange one or more sidelink messages if the UE behavior provides that sidelink communications may be performed based on the associated network energy mode.

In some cases, the network entity 105-b may update a network energy mode. For example, at 330, the network entity 105-b may transmit an updated network link BWP indication, with an updated network energy mode. In such an event, at 335-a, the first UE 115-c may identify the network energy mode, and at 335-b the second UE 115-d may identify the network energy mode. At 340-a, the first UE 115-c may identify the associated sidelink operation mode based on the indicated network energy mode and the configured sidelink behavior associated with the network energy mode. Similarly, at 340-b, the second UE 115-d may identify the associated sidelink operation mode based on the indicated network energy mode and the configured sidelink behavior associated with the network energy mode. At 345, the first UE 115-c and the second UE 115-d may exchange one or more sidelink messages if the UE behavior provides that sidelink communications may be performed based on the associated network energy mode.

Figure 4:
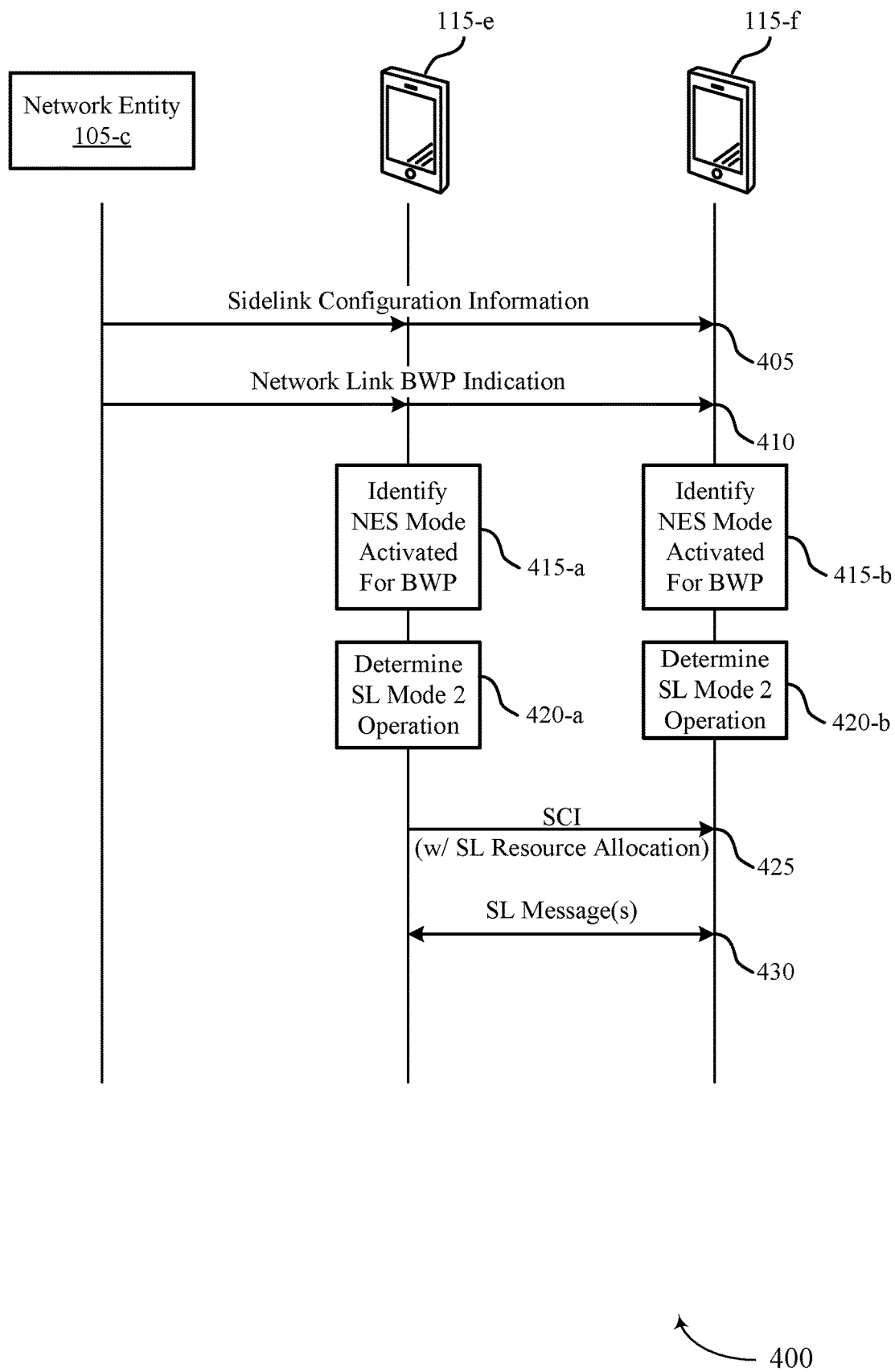
FIG. 4 illustrates an example of a process flow that supports sidelink communication techniques based on network link energy savings modes in accordance with one or more aspects of the present disclosure.

FIG. 4 illustrates another example of a process flow 400 that supports sidelink communication techniques based on network link energy savings modes in accordance with one or more aspects of the present disclosure. In some examples, the process flow 400 may implement or be implemented by aspects of UEs and network entities as described with reference to FIGS. 1 and 2. For example, the process flow 400 may be implemented by a network entity 105-c, a first UE 115-e, and a second UE 115-f, which may be examples of a network entity 105 and a UE 115 as described with reference to FIGS. 1 and 2. The process flow 400 may be implemented by the network entity 105-c and the UEs 115 to exchange signaling to promote network entity power saving and reliable communications between one or more of the network entity 105-c and the UEs 115, and between the first UE 115-e and the second UE 115-f via sidelink communications. In the following description of the process flow 400, the operations between the network entity 105-c the first UE 115-e, and the second UE 115-f, may be transmitted in a different order than the example order shown, or the operations performed by the network entity 105-c, the first UE 115-e, and the second UE 115-f, may be performed in different orders or at different times. Some operations may also be omitted from the process flow 400, and other operations may be added to the process flow 400.

At 405, the network entity 105-c may determine sidelink configuration information and transmit the sidelink configuration information to the first UE 115-e and the second UE 115-f. In this example, the sidelink configuration information may indicate a UE 115 behavior that provides for sidelink mode-2 operation may continue while the associated BWP of the network link has a network energy mode that indicates a dormant BWP or NES state.

At 410, the network entity may transmit a network link BWP indication to one or both of the first UE 115-e or the second UE 115-f. The network link BWP indication may indicate a network energy mode for the BWP for the associated network link, that may indicate the BWP is transitioning to a dormancy state or other NES state. At 415-a, the first UE 115-e may identify the network energy mode with a dormant network link BWP is activated, and at 415-b the second UE 115-f may identify the network energy mode with a dormant network link BWP is activated. At 420-a, the first UE 115-e may determine that sidelink mode-2 operations may be continued. Similarly, at 420-b, the second UE 115-f may determine that sidelink mode-2 operations may be continued. At 425, the first UE 115-e, which may be configured to allocate sidelink resources from a configured sidelink resource pool for different sidelink devices, may transmit SCI to the second UE 115-f. The SCI may indicate a sidelink resource allocation for one or more sidelink communications between the first UE 115-e and the second UE 115-f. At 430, the first UE 115-e and the second UE 115-f may exchange one or more sidelink messages in accordance with the resource allocation provided in the SCI.

Figure 5:
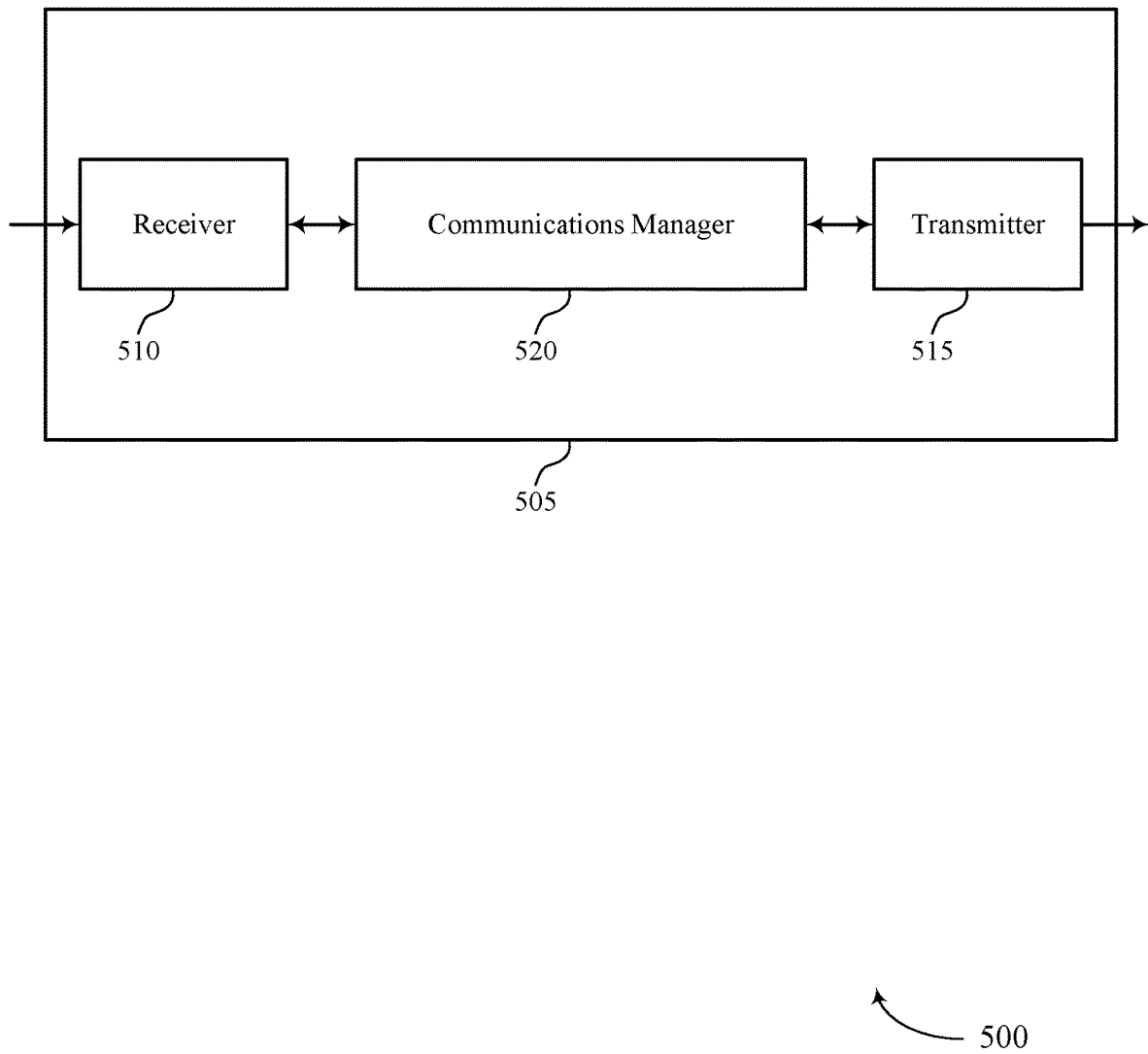
FIGS. 5 and 6 illustrate block diagrams of devices that support sidelink communication techniques based on network link energy savings modes in accordance with one or more aspects of the present disclosure.

FIG. 5 illustrates a block diagram 500 of a device 505 that supports sidelink communication techniques based on network link energy savings modes in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink communication techniques based on network link energy savings modes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink communication techniques based on network link energy savings modes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink communication techniques based on network link energy savings modes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for communicating with a network entity via a first link that includes one or more bandwidth parts, a network energy mode being associated with the one or more bandwidth parts. The communications manager 520 may be configured as or otherwise support a means for identifying a first sidelink operation mode of a set of available sidelink operation modes of a second link that provides sidelink communications with one or more other UEs, the first sidelink operation mode based on the network energy mode. The communications manager 520 may be configured as or otherwise support a means for communicating with the one or more other UEs via the second link in accordance with the first sidelink operation mode.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for sidelink communications based on network energy modes, which may provide enhanced flexibility in selection of operating modes for network links, while also providing corresponding sidelink behavior. Such techniques may allow network entities to reduce operating power, while providing flexible and efficient techniques to indicate operation modes to served devices that may have sidelink connections.

Figure 6:
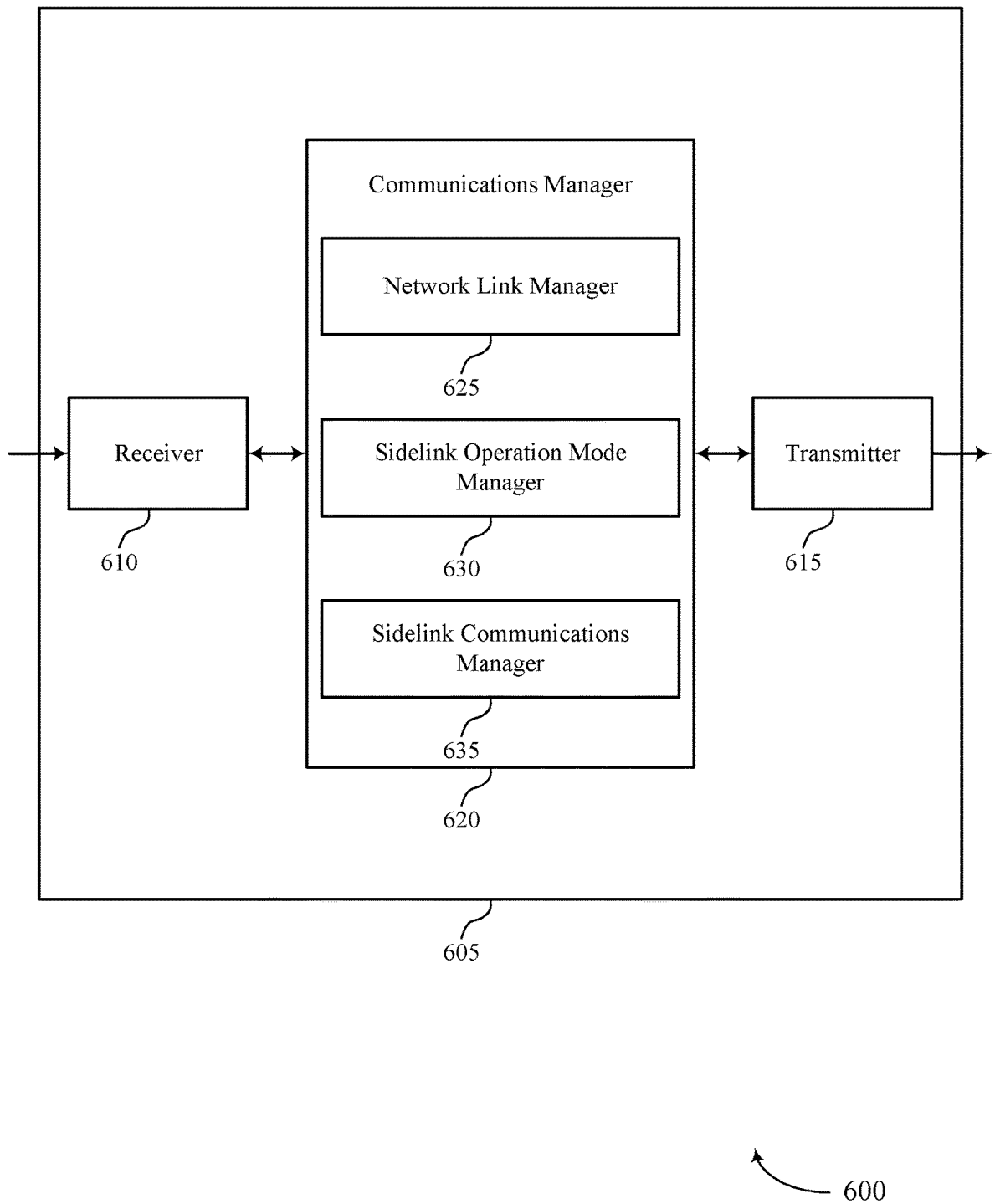

FIG. 6 illustrates a block diagram 600 of a device 605 that supports sidelink communication techniques based on network link energy savings modes in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink communication techniques based on network link energy savings modes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink communication techniques based on network link energy savings modes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink communication techniques based on network link energy savings modes as described herein. For example, the communications manager 620 may include a network link manager 625, a sidelink operation mode manager 630, a sidelink communications manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The network link manager 625 may be configured as or otherwise support a means for communicating with a network entity via a first link that includes one or more bandwidth parts, a network energy mode being associated with the one or more bandwidth parts. The sidelink operation mode manager 630 may be configured as or otherwise support a means for identifying a first sidelink operation mode of a set of available sidelink operation modes of a second link that provides sidelink communications with one or more other UEs, the first sidelink operation mode based on the network energy mode. The sidelink communications manager 635 may be configured as or otherwise support a means for communicating with the one or more other UEs via the second link in accordance with the first sidelink operation mode.

Figure 7:
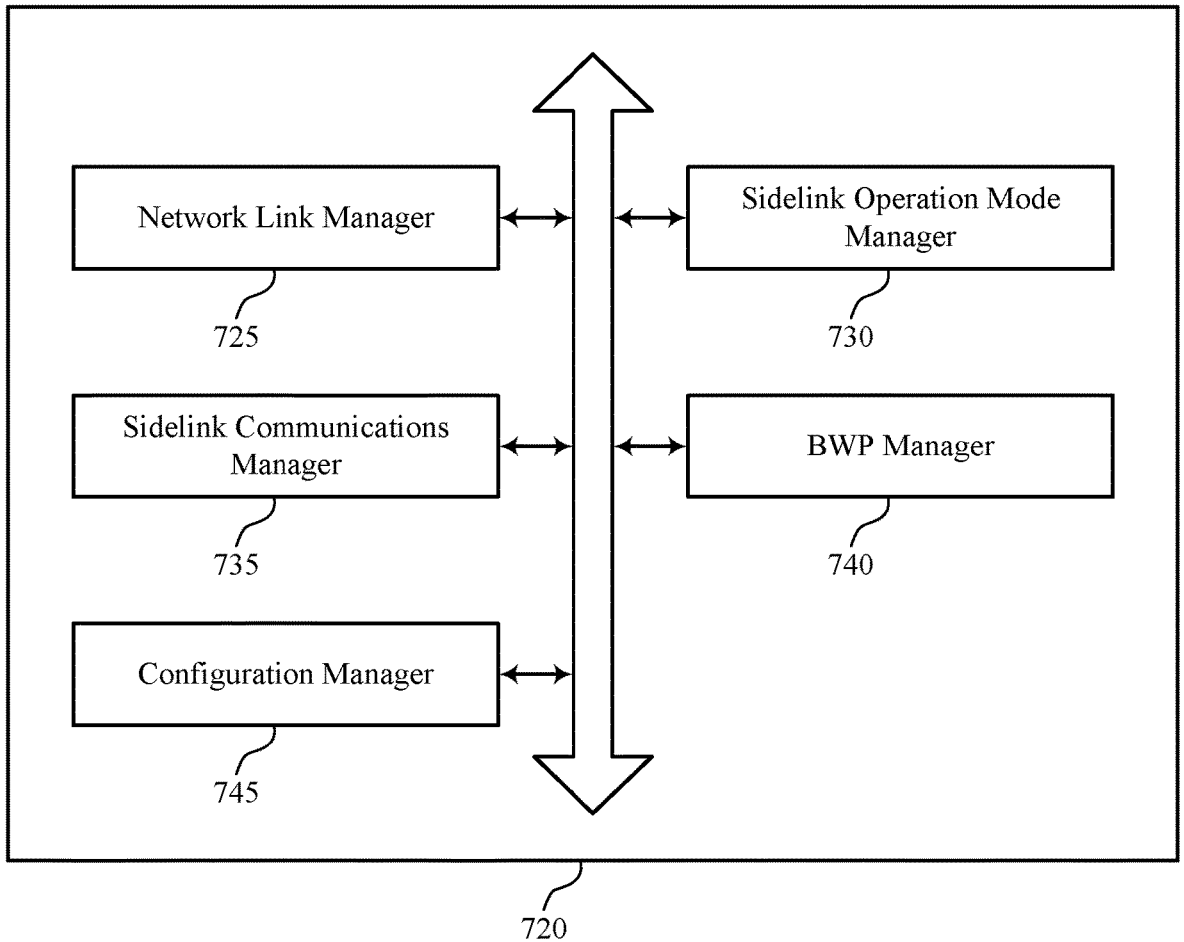
FIG. 7 illustrates a block diagram of a communications manager that supports sidelink communication techniques based on network link energy savings modes in accordance with one or more aspects of the present disclosure.

FIG. 7 illustrates a block diagram 700 of a communications manager 720 that supports sidelink communication techniques based on network link energy savings modes in accordance with one or more aspects of the present disclosure. The communications manager 720 may be an example of aspects of a communications manager 520, a communications manager 620, or both, as described herein. The communications manager 720, or various components thereof, may be an example of means for performing various aspects of sidelink communication techniques based on network link energy savings modes as described herein. For example, the communications manager 720 may include a network link manager 725, a sidelink operation mode manager 730, a sidelink communications manager 735, a BWP manager 740, a configuration manager 745, or any combination thereof. Each of these components may communicate, directly or indirectly, with one another (e.g., via one or more buses).

The communications manager 720 may support wireless communication at a UE in accordance with examples as disclosed herein. The network link manager 725 may be configured as or otherwise support a means for communicating with a network entity via a first link that includes one or more bandwidth parts, a network energy mode being associated with the one or more bandwidth parts. The sidelink operation mode manager 730 may be configured as or otherwise support a means for identifying a first sidelink operation mode of a set of available sidelink operation modes of a second link that provides sidelink communications with one or more other UEs, the first sidelink operation mode based on the network energy mode. The sidelink communications manager 735 may be configured as or otherwise support a means for communicating with the one or more other UEs via the second link in accordance with the first sidelink operation mode.

In some examples, to support identifying, the BWP manager 740 may be configured as or otherwise support a means for receiving an indication that a first bandwidth part is activated for communications on the first link, the first bandwidth part having an associated first network energy mode, and at least a second bandwidth part has an associated second network energy mode that is different than the first network energy mode. In some examples, to support identifying, the sidelink operation mode manager 730 may be configured as or otherwise support a means for identifying the first sidelink operation mode that is associated with the first network energy mode based on the activation of the first bandwidth part, and a second sidelink operation mode of the set of available sidelink operation modes is associated with the second network energy mode. In some examples, the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

In some examples, the BWP manager 740 may be configured as or otherwise support a means for receiving an indication that the first link has a changed bandwidth part that is associated with a different network energy mode. In some examples, the sidelink operation mode manager 730 may be configured as or otherwise support a means for identifying a second sidelink operation mode of the set of available sidelink operation modes based on the changed bandwidth part. In some examples, the sidelink communications manager 735 may be configured as or otherwise support a means for communicating with the one or more other UEs via the second link in accordance with the second sidelink operation mode. In some examples, a first bandwidth part of the one or more bandwidth parts indicates an energy saving mode associated with the first link, and a second bandwidth part of the one or more bandwidth parts indicates a regular network energy mode associated with the first link.

In some examples, the configuration manager 745 may be configured as or otherwise support a means for receiving configuration information that indicates the one or more bandwidth parts of the first link and an associated sidelink operation mode of the set of sidelink operation modes for each of the one or more bandwidth parts. In some examples, a first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications with the one or more UEs when the first link uses the first bandwidth part, and the second sidelink operation mode is used for sidelink communications with the one or more UEs when the first link uses the second bandwidth part.

In some examples, to support receiving the configuration information, the sidelink operation mode manager 730 may be configured as or otherwise support a means for receiving a first information element associated with the first bandwidth part that indicates a first network energy mode and the first sidelink operation mode. In some examples, to support receiving the configuration information, the sidelink operation mode manager 730 may be configured as or otherwise support a means for receiving a second information element associated with the second bandwidth part that indicates a second network energy mode and the second sidelink operation mode.

In some examples, the configuration manager 745 may be configured as or otherwise support a means for receiving configuration information that indicates the set of sidelink operation modes, and a selected sidelink operation mode is indicated from the set of sidelink operation modes. In some examples, the selected sidelink operation mode is indicated with the configuration information, or is dynamically indicated with signaling that activates the bandwidth part for communications using the first link. In some examples, the first link includes two or more component carriers, and where the first sidelink operation mode based on the network energy mode associated with the one or more bandwidth parts of a first component carrier of the two or more component carriers.

In some examples, the network link manager 725 may be configured as or otherwise support a means for receiving configuration information for the two or more component carriers, the configuration information indicating whether an associated component carrier is linked to the set of sidelink operation modes. In some examples, the configuration information associated with each component carrier includes an information element with a Boolean value that indicates whether or not a corresponding component carrier is linked to the set of sidelink operation modes.

Figure 8:
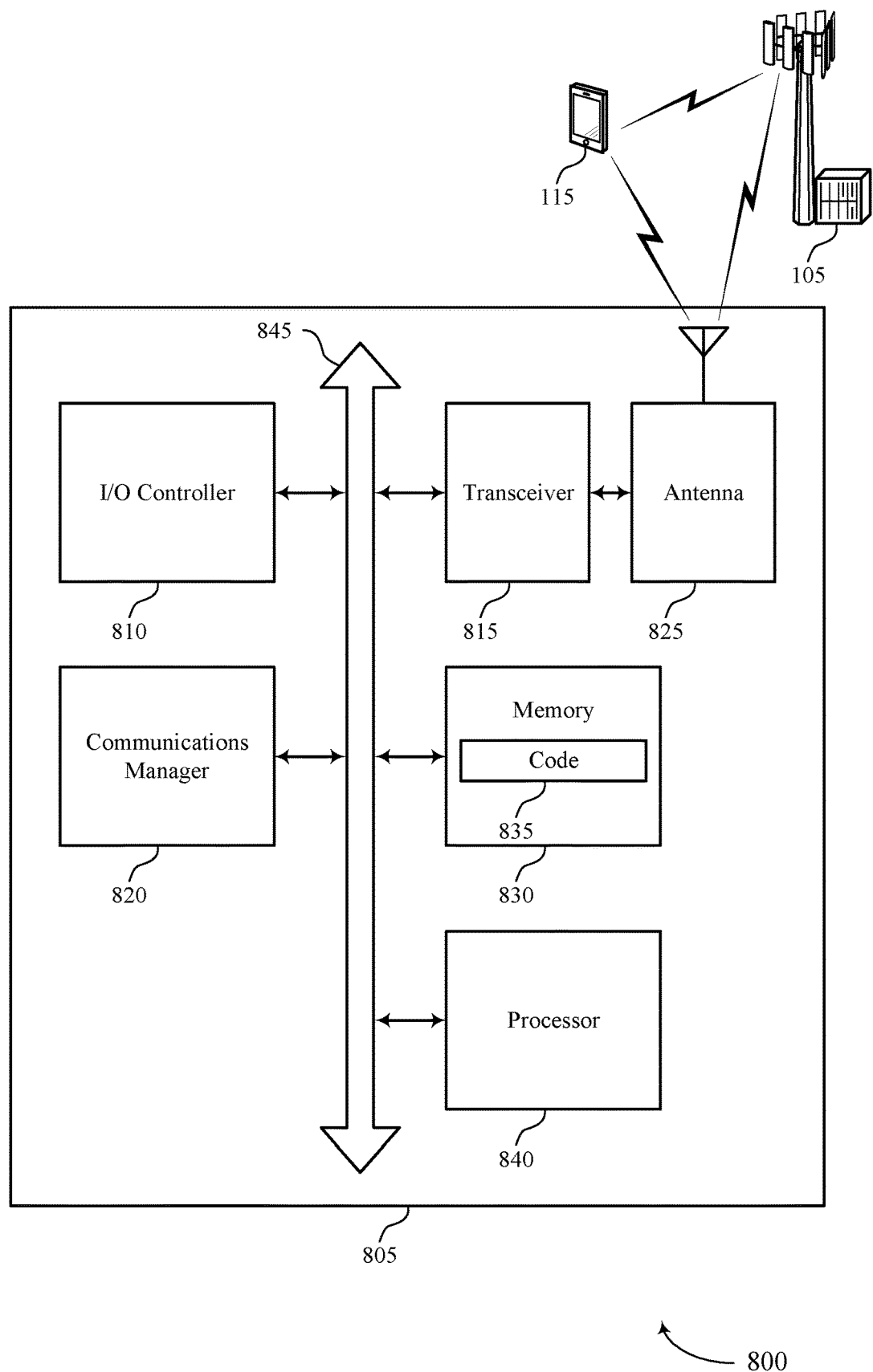
FIG. 8 illustrates a diagram of a system including a device that supports sidelink communication techniques based on network link energy savings modes in accordance with one or more aspects of the present disclosure.

FIG. 8 illustrates a diagram of a system 800 including a device 805 that supports sidelink communication techniques based on network link energy savings modes in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink communication techniques based on network link energy savings modes). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for communicating with a network entity via a first link that includes one or more bandwidth parts, a network energy mode being associated with the one or more bandwidth parts. The communications manager 820 may be configured as or otherwise support a means for identifying a first sidelink operation mode of a set of available sidelink operation modes of a second link that provides sidelink communications with one or more other UEs, the first sidelink operation mode based on the network energy mode. The communications manager 820 may be configured as or otherwise support a means for communicating with the one or more other UEs via the second link in accordance with the first sidelink operation mode.

By including or configuring the communications manager 820 in accordance with examples as described herein, the device 805 may support techniques for sidelink communications based on network energy modes, which may provide enhanced flexibility in selection of operating modes for network links, while also providing corresponding sidelink behavior. Such techniques may allow network entities to reduce operating power, while providing flexible and efficient techniques to indicate operation modes to served devices that may have sidelink connections.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink communication techniques based on network link energy savings modes as described herein, or the processor 840 and the memory 830 may be otherwise configured to perform or support such operations.

Figure 9:
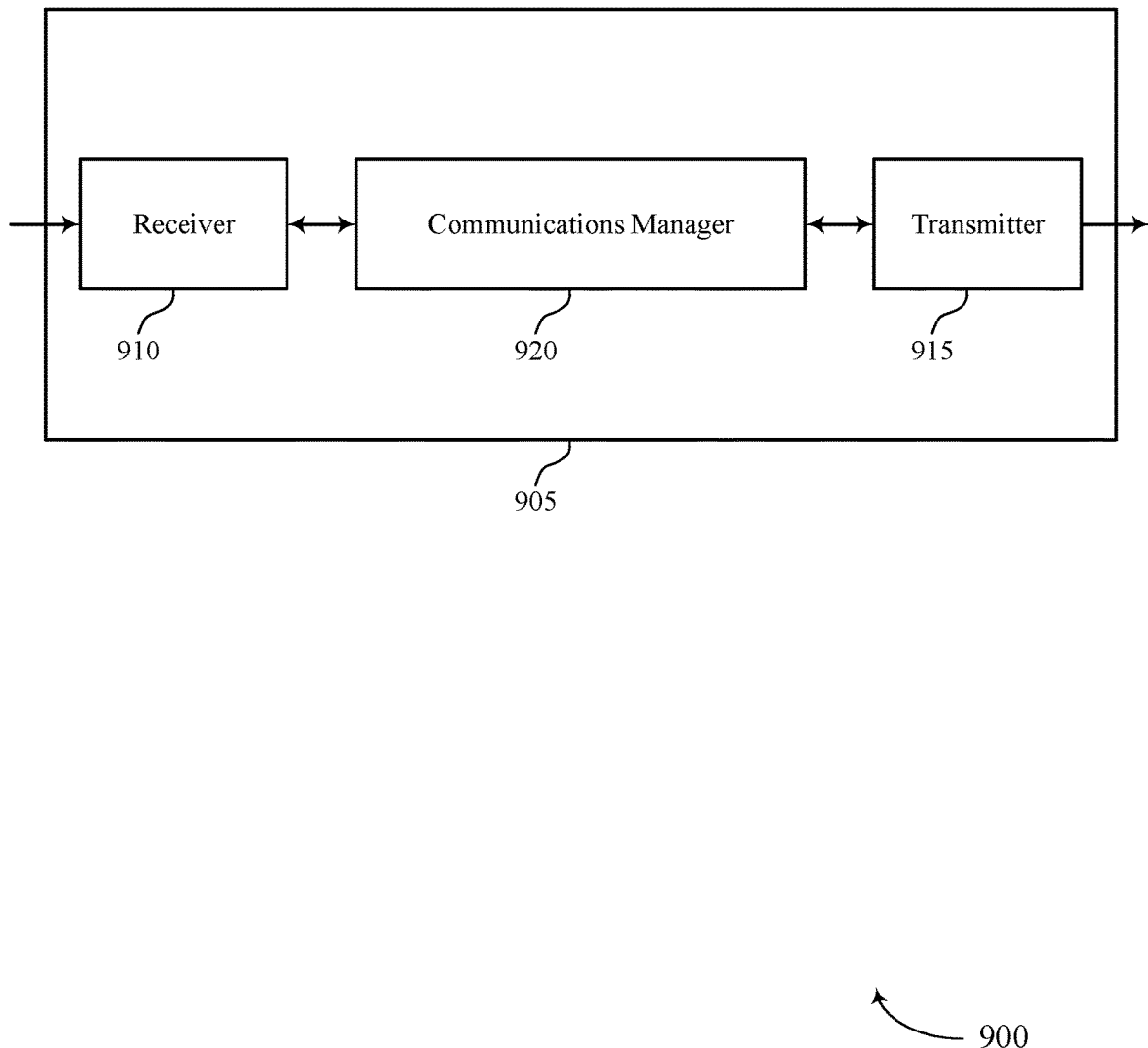
FIGS. 9 and 10 illustrate block diagrams of devices that support sidelink communication techniques based on network link energy savings modes in accordance with one or more aspects of the present disclosure.

FIG. 9 illustrates a block diagram 900 of a device 905 that supports sidelink communication techniques based on network link energy savings modes in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of sidelink communication techniques based on network link energy savings modes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for communicating with a first UE via a first link that includes one or more bandwidth parts, a network energy mode being associated with the one or more bandwidth parts. The communications manager 920 may be configured as or otherwise support a means for configuring the first UE with a set of available sidelink operation modes for a second link that provides sidelink communications for the first UE and one or more other UEs, a first sidelink operation mode of the set of available sidelink operation modes associated with the network energy mode.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for sidelink communications based on network energy modes, which may provide enhanced flexibility in selection of operating modes for network links, while also providing corresponding sidelink behavior. Such techniques may allow network entities to reduce operating power, while providing flexible and efficient techniques to indicate operation modes to served devices that may have sidelink connections.

Figure 10:
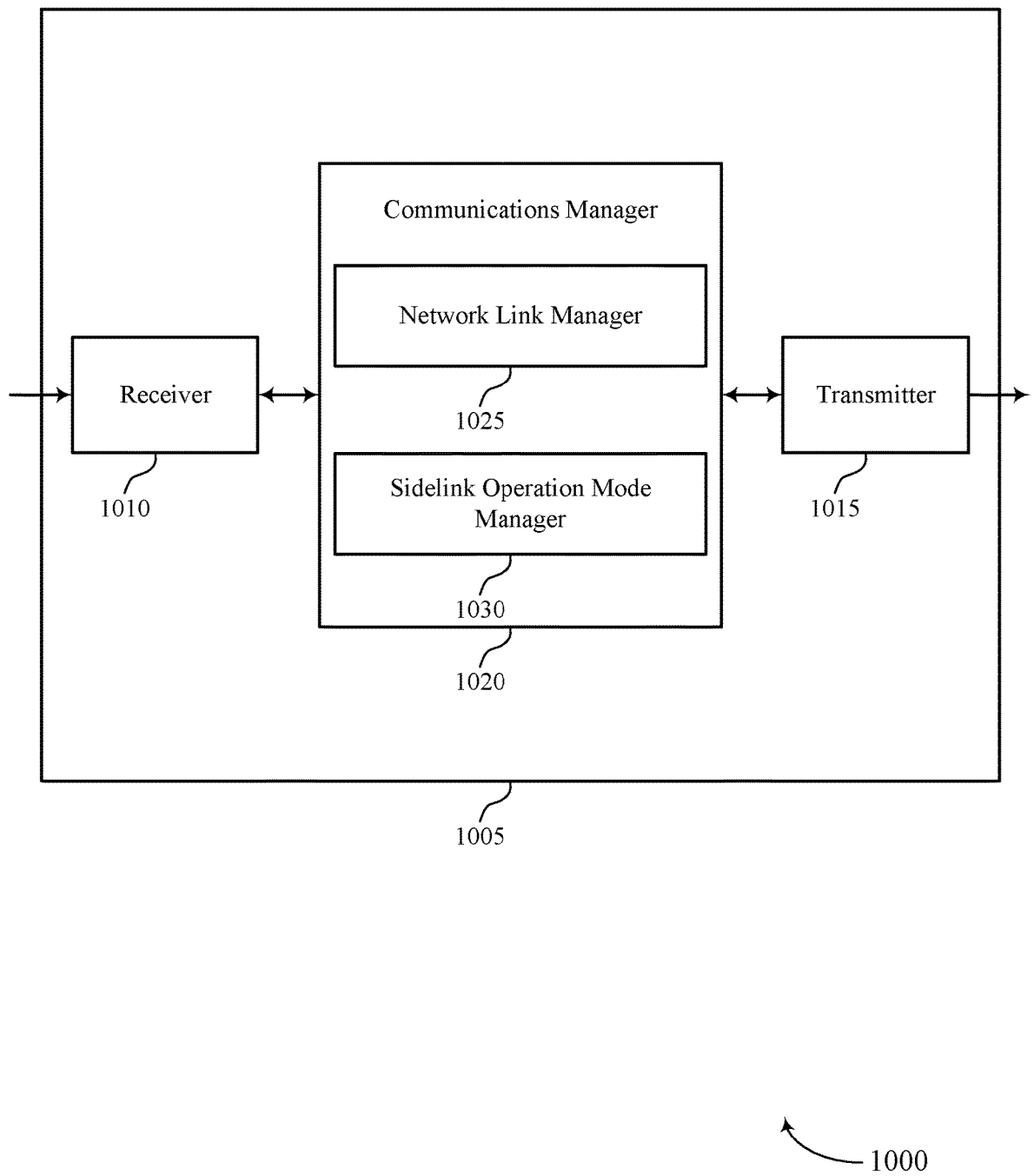

FIG. 10 illustrates a block diagram 1000 of a device 1005 that supports sidelink communication techniques based on network link energy savings modes in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of sidelink communication techniques based on network link energy savings modes as described herein. For example, the communications manager 1020 may include a network link manager 1025 a sidelink operation mode manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The network link manager 1025 may be configured as or otherwise support a means for communicating with a first UE via a first link that includes one or more bandwidth parts, a network energy mode being associated with the one or more bandwidth parts. The sidelink operation mode manager 1030 may be configured as or otherwise support a means for configuring the first UE with a set of available sidelink operation modes for a second link that provides sidelink communications for the first UE and one or more other UEs, a first sidelink operation mode of the set of available sidelink operation modes associated with the network energy mode.

Figure 11:
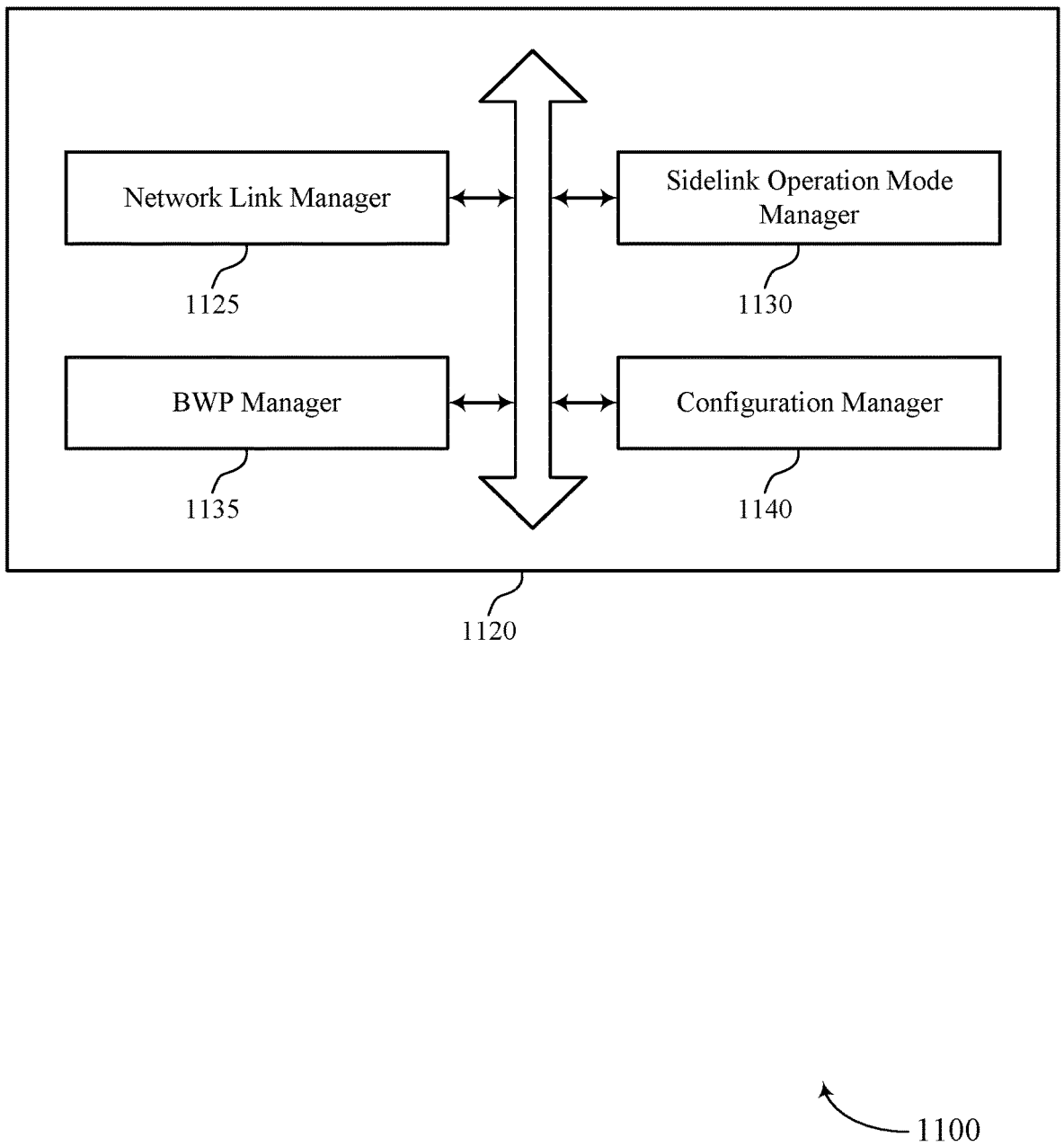
FIG. 11 illustrates a block diagram of a communications manager that supports sidelink communication techniques based on network link energy savings modes in accordance with one or more aspects of the present disclosure.

FIG. 11 illustrates a block diagram 1100 of a communications manager 1120 that supports sidelink communication techniques based on network link energy savings modes in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of sidelink communication techniques based on network link energy savings modes as described herein. For example, the communications manager 1120 may include a network link manager 1125, a sidelink operation mode manager 1130, a BWP manager 1135, a configuration manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The network link manager 1125 may be configured as or otherwise support a means for communicating with a first UE via a first link that includes one or more bandwidth parts, a network energy mode being associated with the one or more bandwidth parts. The sidelink operation mode manager 1130 may be configured as or otherwise support a means for configuring the first UE with a set of available sidelink operation modes for a second link that provides sidelink communications for the first UE and one or more other UEs, a first sidelink operation mode of the set of available sidelink operation modes associated with the network energy mode.

In some examples, the BWP manager 1135 may be configured as or otherwise support a means for transmitting an indication that a first bandwidth part is activated for communications with the first UE on the first link, the first bandwidth part having an associated first network energy mode, and at least a second bandwidth part having an associated second network energy mode that is different than the first network energy mode, where the first sidelink operation mode is associated with the first network energy mode based on the activation of the first bandwidth part, and a second sidelink operation mode of the set of available sidelink operation modes is associated with the second network energy mode based on activation of the second bandwidth part. In some examples, the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

In some examples, the BWP manager 1135 may be configured as or otherwise support a means for transmitting an indication to the first UE that the first link has a changed bandwidth part that is associated with a different network energy mode, where a second sidelink operation mode of the set of available sidelink operation modes is associated with the changed bandwidth part and sidelink communications via the second link are in accordance with the second sidelink operation mode responsive to the indication that the first link has the changed bandwidth part. In some examples, a first bandwidth part of the one or more bandwidth parts indicates an energy saving mode associated with the first link, and a second bandwidth part of the one or more bandwidth parts indicates a regular network energy mode associated with the first link.

In some examples, the configuration manager 1140 may be configured as or otherwise support a means for transmitting configuration information to the first UE that indicates the one or more bandwidth parts of the first link and an associated sidelink operation mode of the set of sidelink operation modes for each of the one or more bandwidth parts. In some examples, a first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications among the UEs when the first link uses the first bandwidth part, and the second sidelink operation mode is used for sidelink communications among the UEs when the first link uses the second bandwidth part.

In some examples, the configuration manager 1140 may be configured as or otherwise support a means for transmitting configuration information that indicates the set of sidelink operation modes, and a selected sidelink operation mode is indicated from the set of sidelink operation modes. In some examples, the selected sidelink operation mode is indicated with the configuration information, or is dynamically indicated with signaling that activates the bandwidth part for communications using the first link. In some examples, the first link includes two or more component carriers, and where the first sidelink operation mode based on the network energy mode associated with the one or more bandwidth parts of a first component carrier of the two or more component carriers.

In some examples, the sidelink operation mode manager 1130 may be configured as or otherwise support a means for transmitting configuration information for the two or more component carriers, the configuration information indicating whether an associated component carrier is linked to the set of sidelink operation modes.

Figure 12:
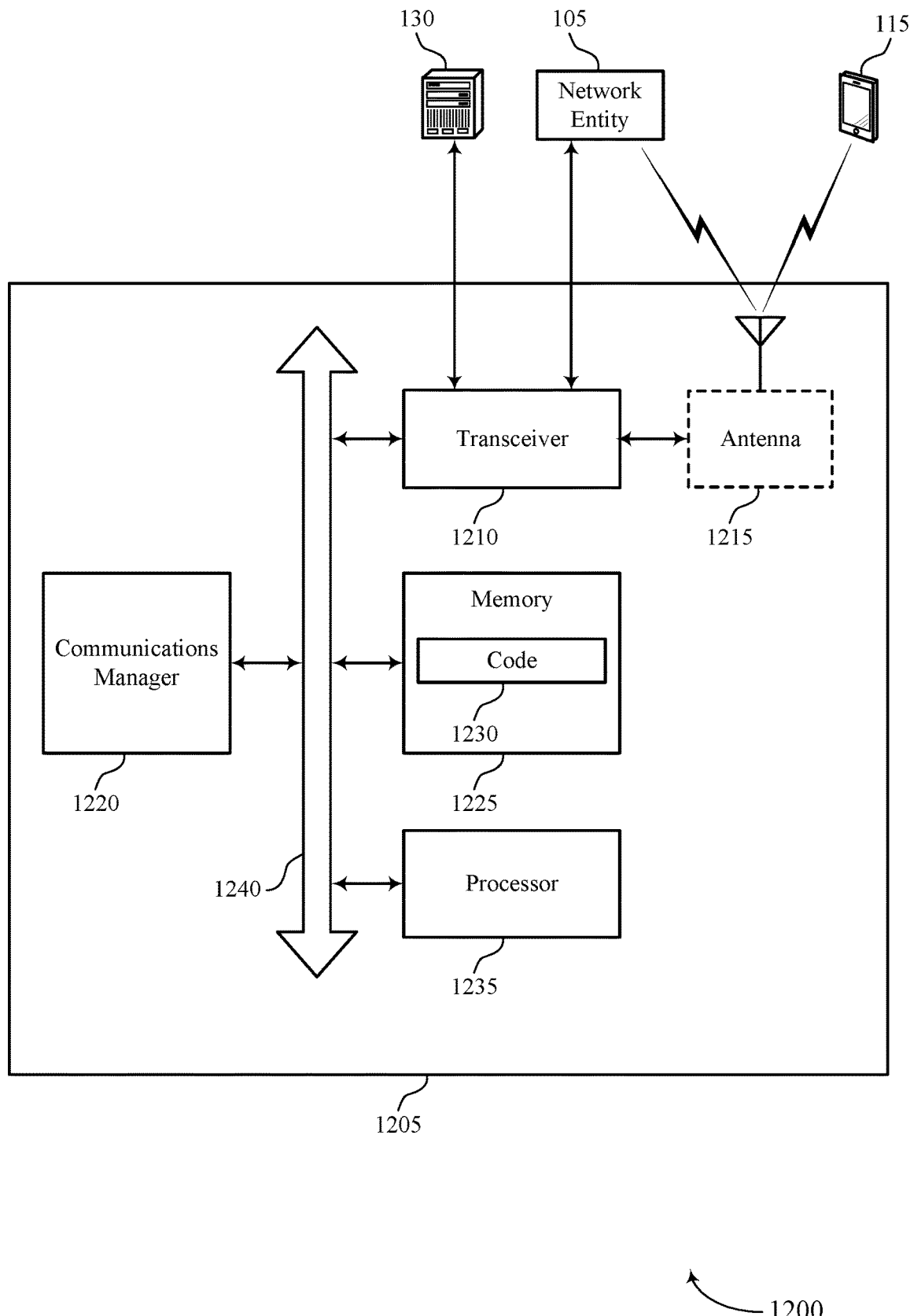
FIG. 12 illustrates a diagram of a system including a device that supports sidelink communication techniques based on network link energy savings modes in accordance with one or more aspects of the present disclosure.

FIG. 12 illustrates a diagram of a system 1200 including a device 1205 that supports sidelink communication techniques based on network link energy savings modes in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting sidelink communication techniques based on network link energy savings modes). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for communicating with a first UE via a first link that includes one or more bandwidth parts, a network energy mode being associated with the one or more bandwidth parts. The communications manager 1220 may be configured as or otherwise support a means for configuring the first UE with a set of available sidelink operation modes for a second link that provides sidelink communications for the first UE and one or more other UEs, a first sidelink operation mode of the set of available sidelink operation modes associated with the network energy mode.

By including or configuring the communications manager 1220 in accordance with examples as described herein, the device 1205 may support techniques for sidelink communications based on network energy modes, which may provide enhanced flexibility in selection of operating modes for network links, while also providing corresponding sidelink behavior. Such techniques may allow network entities to reduce operating power, while providing flexible and efficient techniques to indicate operation modes to served devices that may have sidelink connections.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of sidelink communication techniques based on network link energy savings modes as described herein, or the processor 1235 and the memory 1225 may be otherwise configured to perform or support such operations.

Figure 13:
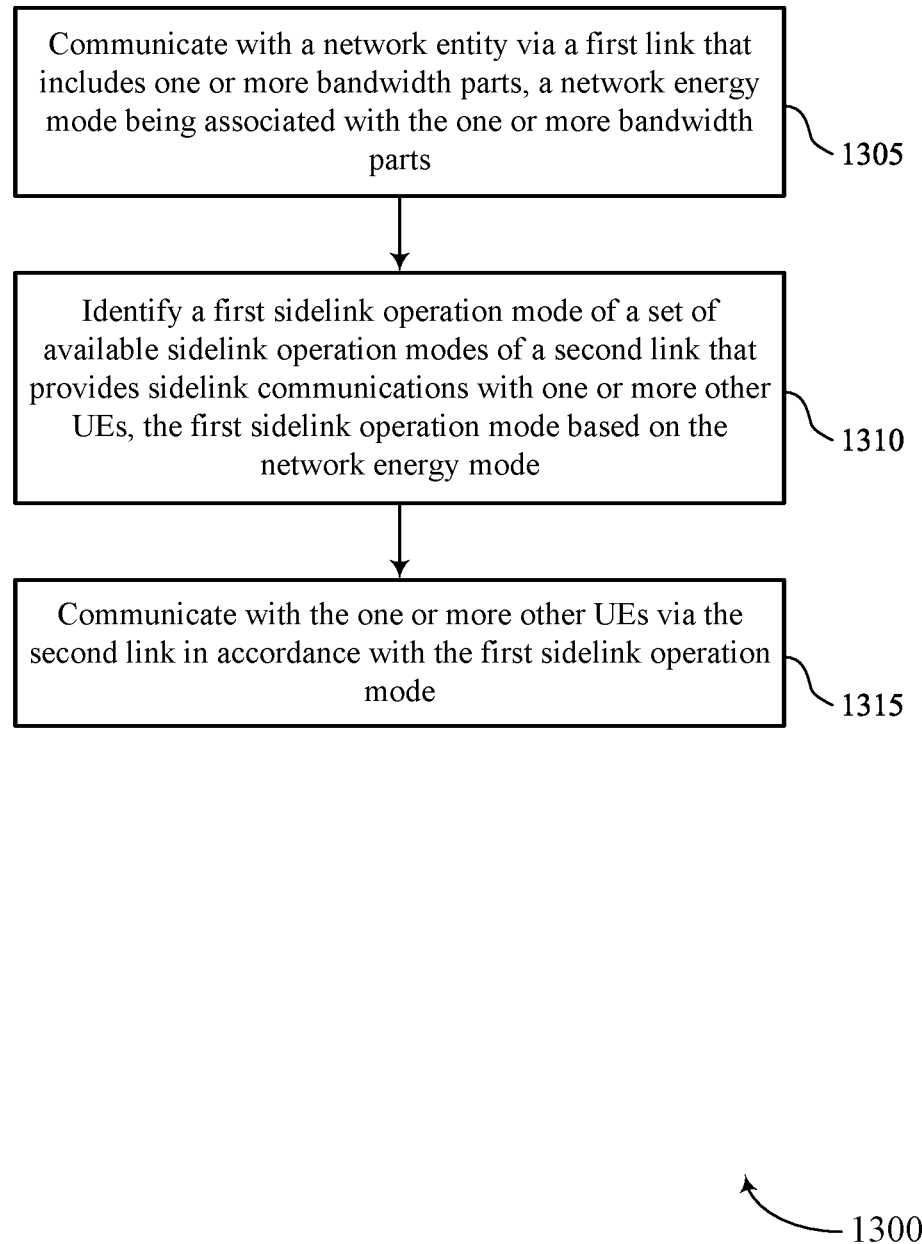
FIGS. 13 through 19 illustrate flowcharts showing methods that support sidelink communication techniques based on network link energy savings modes in accordance with one or more aspects of the present disclosure.

FIG. 13 illustrates a flowchart showing a method 1300 that supports sidelink communication techniques based on network link energy savings modes in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include communicating with a network entity via a first link that includes one or more bandwidth parts, a network energy mode being associated with the one or more bandwidth parts. The operations of 1305 may be performed in accordance with examples as disclosed herein. In some examples, aspects of the operations of 1305 may be performed by a network link manager 725 as described with reference to FIG. 7.

At 1310, the method may include identifying a first sidelink operation mode of a set of available sidelink operation modes of a second link that provides sidelink communications with one or more other UEs, the first sidelink operation mode based on the network energy mode. The operations of 1310 may be performed in accordance with examples as disclosed herein. In some examples, aspects of the operations of 1310 may be performed by a sidelink operation mode manager 730 as described with reference to FIG. 7.

At 1315, the method may include communicating with the one or more other UEs via the second link in accordance with the first sidelink operation mode. The operations of 1315 may be performed in accordance with examples as disclosed herein. In some examples, aspects of the operations of 1315 may be performed by a sidelink communications manager 735 as described with reference to FIG. 7.

Figure 14:
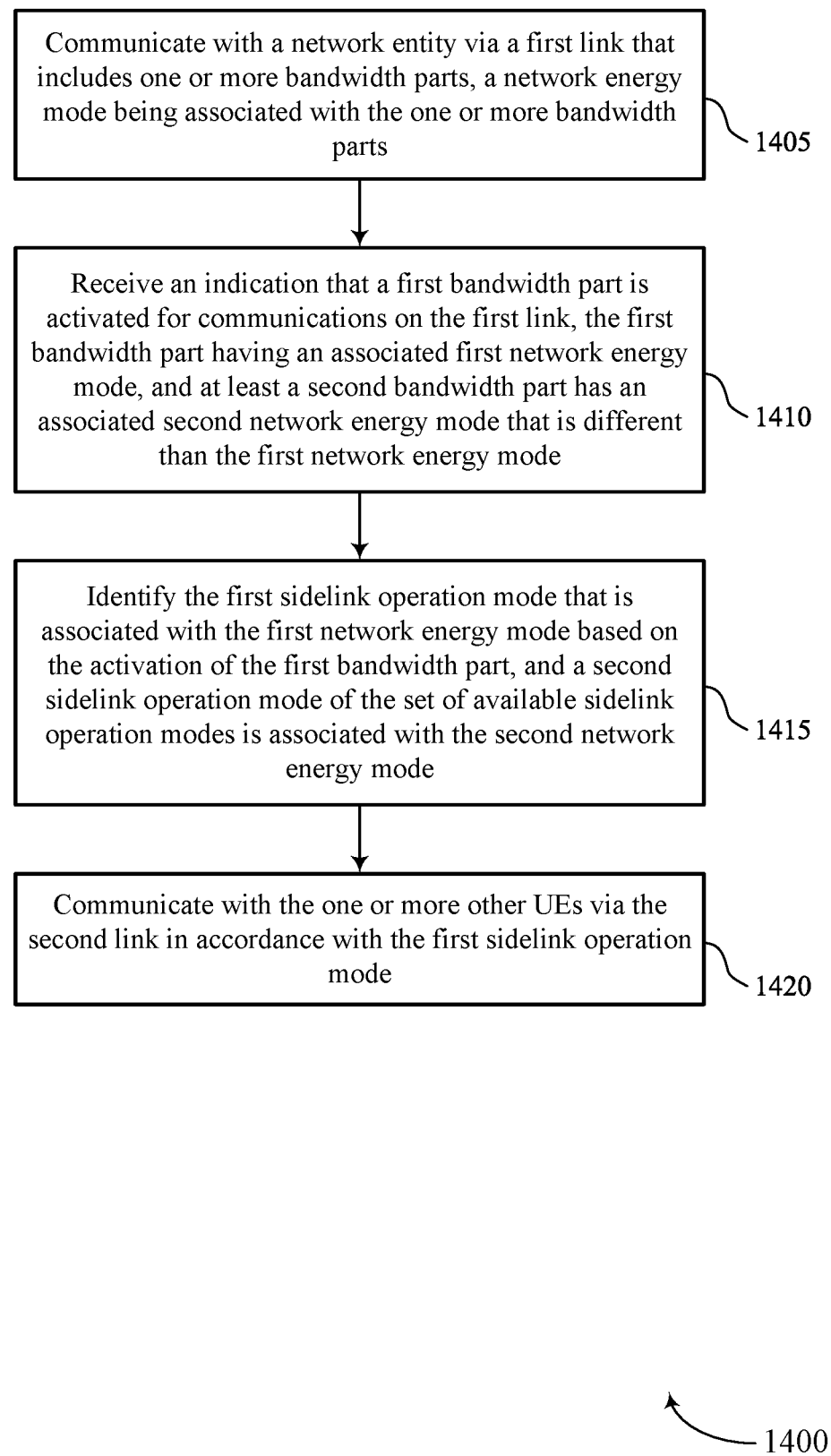

FIG. 14 illustrates a flowchart showing a method 1400 that supports sidelink communication techniques based on network link energy savings modes in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include communicating with a network entity via a first link that includes one or more bandwidth parts, a network energy mode being associated with the one or more bandwidth parts. The operations of 1405 may be performed in accordance with examples as disclosed herein. In some examples, aspects of the operations of 1405 may be performed by a network link manager 725 as described with reference to FIG. 7.

At 1410, the method may include receiving an indication that a first bandwidth part is activated for communications on the first link, the first bandwidth part having an associated first network energy mode, and at least a second bandwidth part has an associated second network energy mode that is different than the first network energy mode. The operations of 1410 may be performed in accordance with examples as disclosed herein. In some examples, aspects of the operations of 1410 may be performed by a BWP manager 740 as described with reference to FIG. 7.

At 1415, the method may include identifying the first sidelink operation mode that is associated with the first network energy mode based on the activation of the first bandwidth part, and a second sidelink operation mode of the set of available sidelink operation modes is associated with the second network energy mode. The operations of 1415 may be performed in accordance with examples as disclosed herein. In some examples, aspects of the operations of 1415 may be performed by a sidelink operation mode manager 730 as described with reference to FIG. 7.

At 1420, the method may include communicating with the one or more other UEs via the second link in accordance with the first sidelink operation mode. The operations of 1420 may be performed in accordance with examples as disclosed herein. In some examples, aspects of the operations of 1420 may be performed by a sidelink communications manager 735 as described with reference to FIG. 7.

Figure 15:
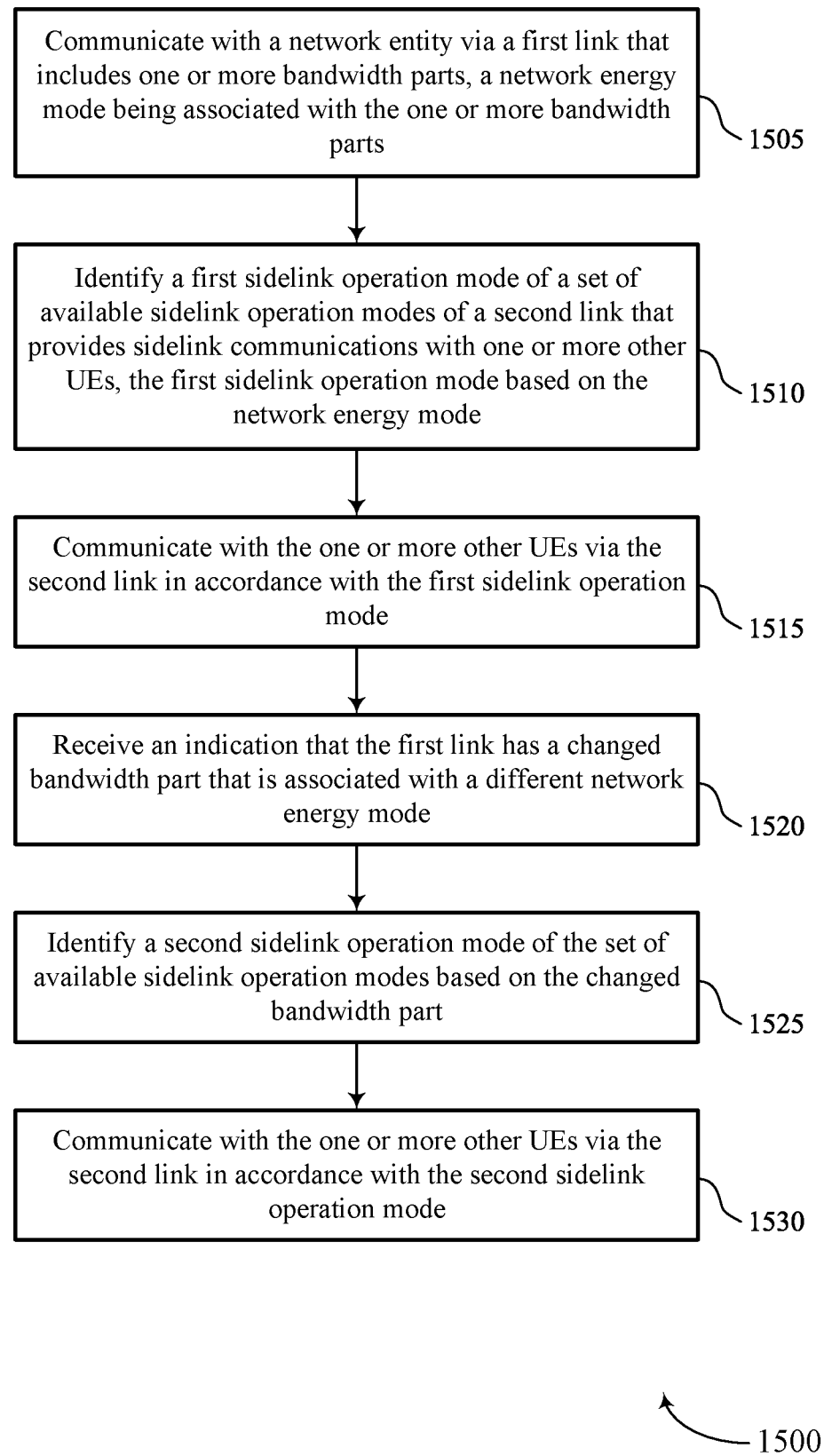

FIG. 15 illustrates a flowchart showing a method 1500 that supports sidelink communication techniques based on network link energy savings modes in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include communicating with a network entity via a first link that includes one or more bandwidth parts, a network energy mode being associated with the one or more bandwidth parts. The operations of 1505 may be performed in accordance with examples as disclosed herein. In some examples, aspects of the operations of 1505 may be performed by a network link manager 725 as described with reference to FIG. 7.

At 1510, the method may include identifying a first sidelink operation mode of a set of available sidelink operation modes of a second link that provides sidelink communications with one or more other UEs, the first sidelink operation mode based on the network energy mode. The operations of 1510 may be performed in accordance with examples as disclosed herein. In some examples, aspects of the operations of 1510 may be performed by a sidelink operation mode manager 730 as described with reference to FIG. 7.

At 1515, the method may include communicating with the one or more other UEs via the second link in accordance with the first sidelink operation mode. The operations of 1515 may be performed in accordance with examples as disclosed herein. In some examples, aspects of the operations of 1515 may be performed by a sidelink communications manager 735 as described with reference to FIG. 7.

At 1520, the method may include receiving an indication that the first link has a changed bandwidth part that is associated with a different network energy mode. The operations of 1520 may be performed in accordance with examples as disclosed herein. In some examples, aspects of the operations of 1520 may be performed by a BWP manager 740 as described with reference to FIG. 7.

At 1525, the method may include identifying a second sidelink operation mode of the set of available sidelink operation modes based on the changed bandwidth part. The operations of 1525 may be performed in accordance with examples as disclosed herein. In some examples, aspects of the operations of 1525 may be performed by a sidelink operation mode manager 730 as described with reference to FIG. 7.

At 1530, the method may include communicating with the one or more other UEs via the second link in accordance with the second sidelink operation mode. The operations of 1530 may be performed in accordance with examples as disclosed herein. In some examples, aspects of the operations of 1530 may be performed by a sidelink communications manager 735 as described with reference to FIG. 7.

Figure 16:
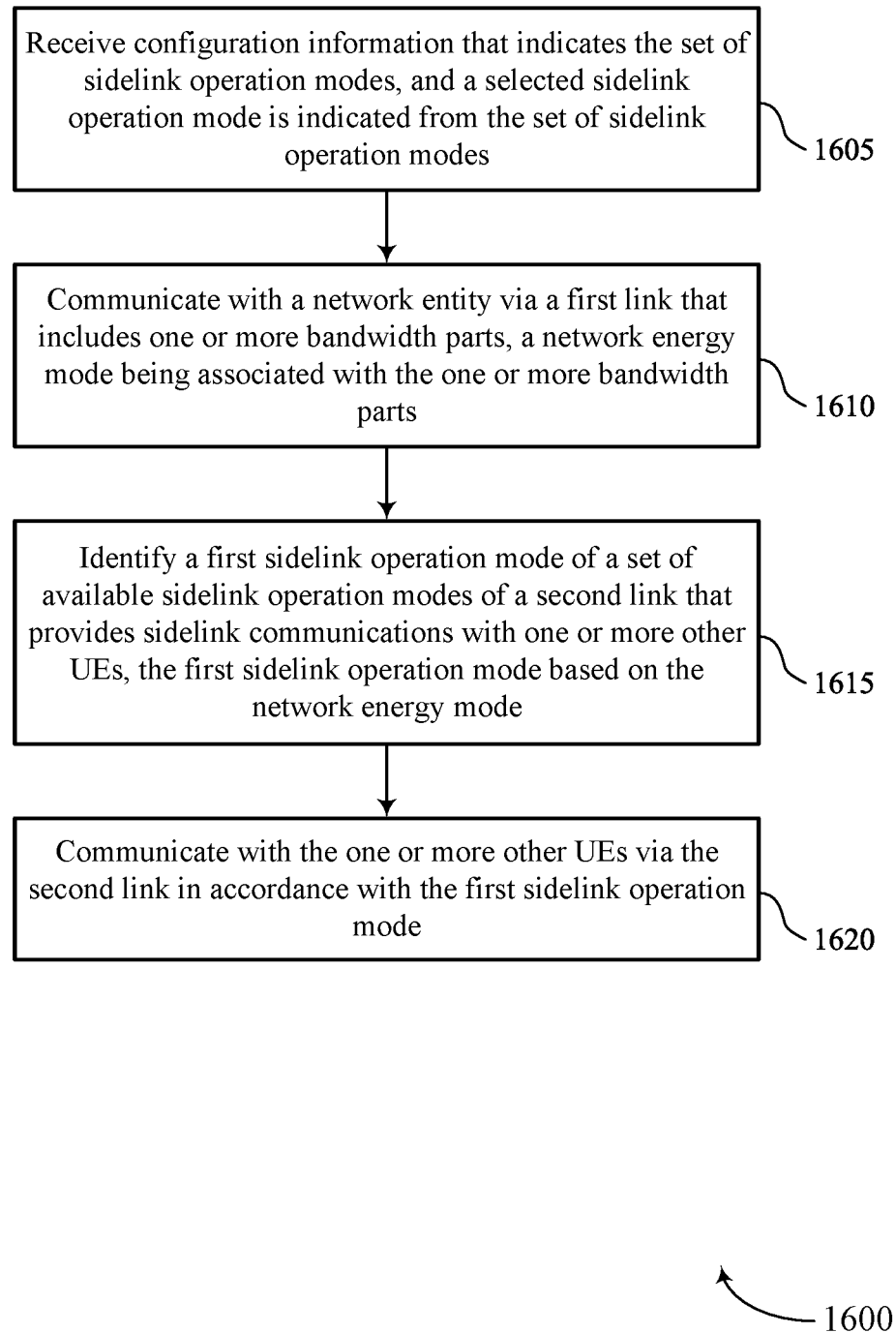

FIG. 16 illustrates a flowchart showing a method 1600 that supports sidelink communication techniques based on network link energy savings modes in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving configuration information that indicates the set of sidelink operation modes, and a selected sidelink operation mode is indicated from the set of sidelink operation modes. The operations of 1605 may be performed in accordance with examples as disclosed herein. In some examples, aspects of the operations of 1605 may be performed by a configuration manager 745 as described with reference to FIG. 7.

At 1610, the method may include communicating with a network entity via a first link that includes one or more bandwidth parts, a network energy mode being associated with the one or more bandwidth parts. The operations of 1610 may be performed in accordance with examples as disclosed herein. In some examples, aspects of the operations of 1610 may be performed by a network link manager 725 as described with reference to FIG. 7.

At 1615, the method may include identifying a first sidelink operation mode of a set of available sidelink operation modes of a second link that provides sidelink communications with one or more other UEs, the first sidelink operation mode based on the network energy mode. The operations of 1615 may be performed in accordance with examples as disclosed herein. In some examples, aspects of the operations of 1615 may be performed by a sidelink operation mode manager 730 as described with reference to FIG. 7.

At 1620, the method may include communicating with the one or more other UEs via the second link in accordance with the first sidelink operation mode. The operations of 1620 may be performed in accordance with examples as disclosed herein. In some examples, aspects of the operations of 1620 may be performed by a sidelink communications manager 735 as described with reference to FIG. 7.

Figure 17:
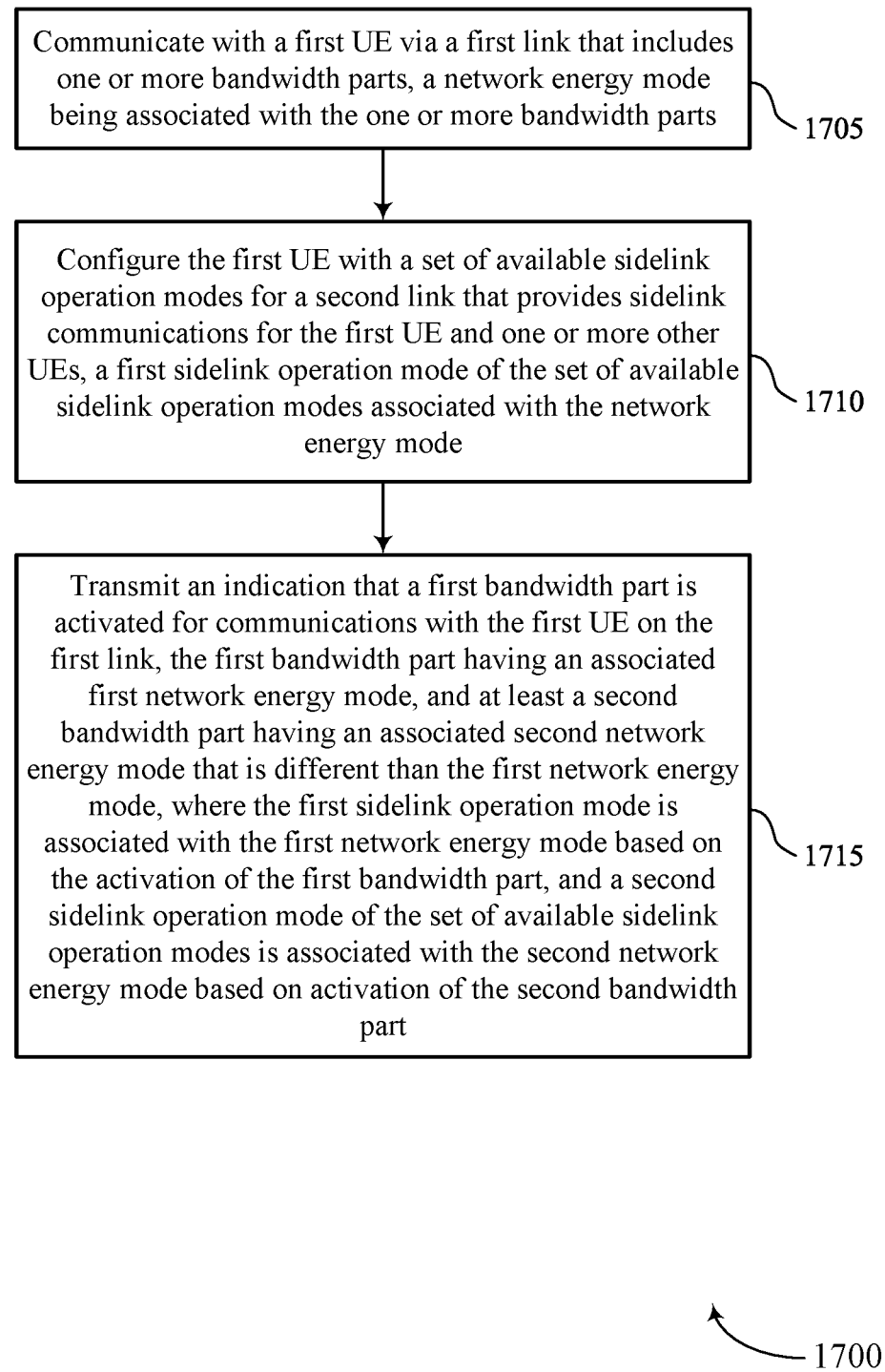

FIG. 17 illustrates a flowchart showing a method 1700 that supports sidelink communication techniques based on network link energy savings modes in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include communicating with a first UE via a first link that includes one or more bandwidth parts, a network energy mode being associated with the one or more bandwidth parts. The operations of 1705 may be performed in accordance with examples as disclosed herein. In some examples, aspects of the operations of 1705 may be performed by a network link manager 1125 as described with reference to FIG. 11.

At 1710, the method may include configuring the first UE with a set of available sidelink operation modes for a second link that provides sidelink communications for the first UE and one or more other UEs, a first sidelink operation mode of the set of available sidelink operation modes associated with the network energy mode. The operations of 1710 may be performed in accordance with examples as disclosed herein. In some examples, aspects of the operations of 1710 may be performed by a sidelink operation mode manager 1130 as described with reference to FIG. 11.

At 1715, the method may include transmitting an indication that a first bandwidth part is activated for communications with the first UE on the first link, the first bandwidth part having an associated first network energy mode, and at least a second bandwidth part having an associated second network energy mode that is different than the first network energy mode, where the first sidelink operation mode is associated with the first network energy mode based on the activation of the first bandwidth part, and a second sidelink operation mode of the set of available sidelink operation modes is associated with the second network energy mode based on activation of the second bandwidth part. The operations of 1715 may be performed in accordance with examples as disclosed herein. In some examples, aspects of the operations of 1715 may be performed by a BWP manager 1135 as described with reference to FIG. 11.

Figure 18:
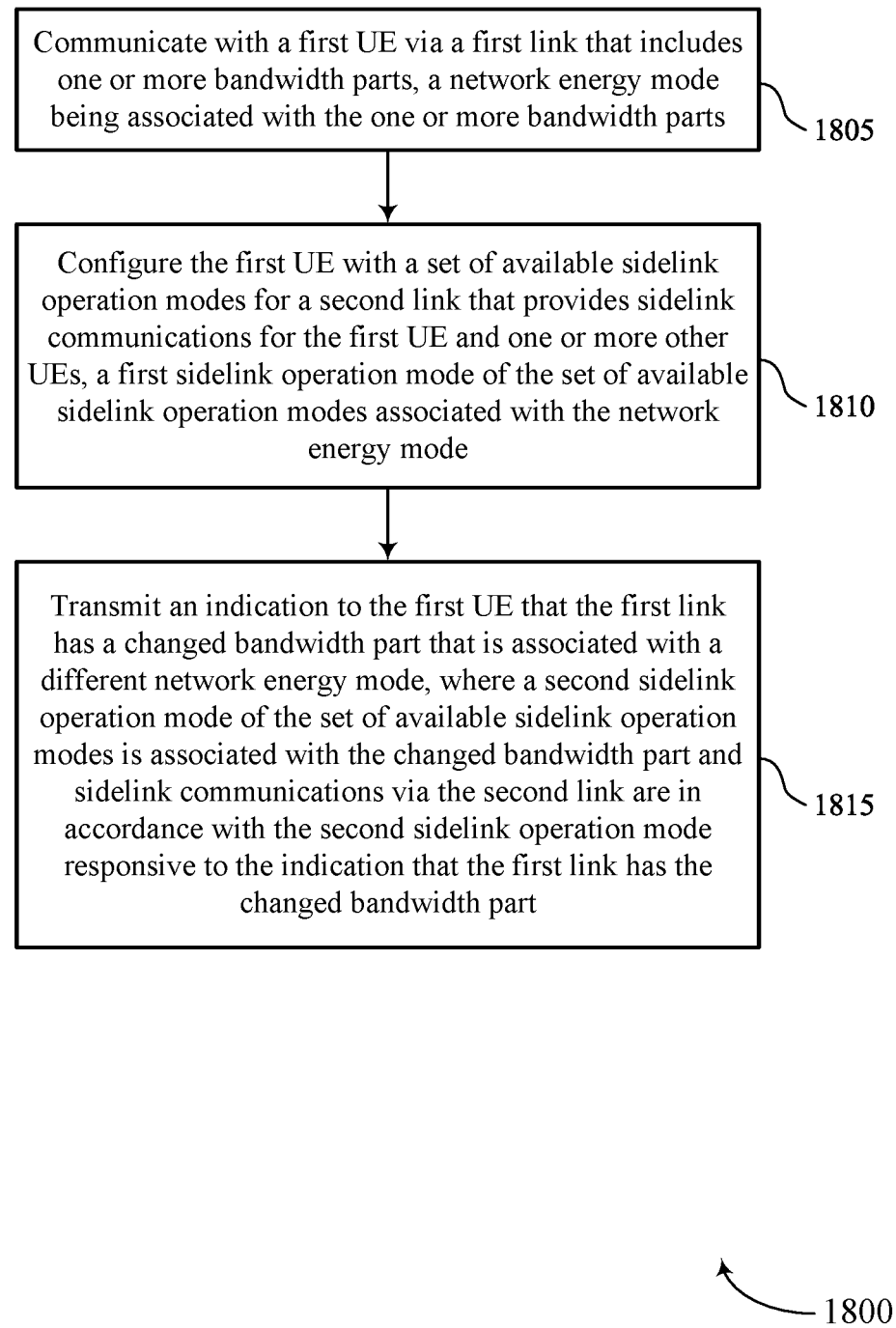

FIG. 18 illustrates a flowchart showing a method 1800 that supports sidelink communication techniques based on network link energy savings modes in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include communicating with a first UE via a first link that includes one or more bandwidth parts, a network energy mode being associated with the one or more bandwidth parts. The operations of 1805 may be performed in accordance with examples as disclosed herein. In some examples, aspects of the operations of 1805 may be performed by a network link manager 1125 as described with reference to FIG. 11.

At 1810, the method may include configuring the first UE with a set of available sidelink operation modes for a second link that provides sidelink communications for the first UE and one or more other UEs, a first sidelink operation mode of the set of available sidelink operation modes associated with the network energy mode. The operations of 1810 may be performed in accordance with examples as disclosed herein. In some examples, aspects of the operations of 1810 may be performed by a sidelink operation mode manager 1130 as described with reference to FIG. 11.

At 1815, the method may include transmitting an indication to the first UE that the first link has a changed bandwidth part that is associated with a different network energy mode, where a second sidelink operation mode of the set of available sidelink operation modes is associated with the changed bandwidth part and sidelink communications via the second link are in accordance with the second sidelink operation mode responsive to the indication that the first link has the changed bandwidth part. The operations of 1815 may be performed in accordance with examples as disclosed herein. In some examples, aspects of the operations of 1815 may be performed by a BWP manager 1135 as described with reference to FIG. 11.

Figure 19:
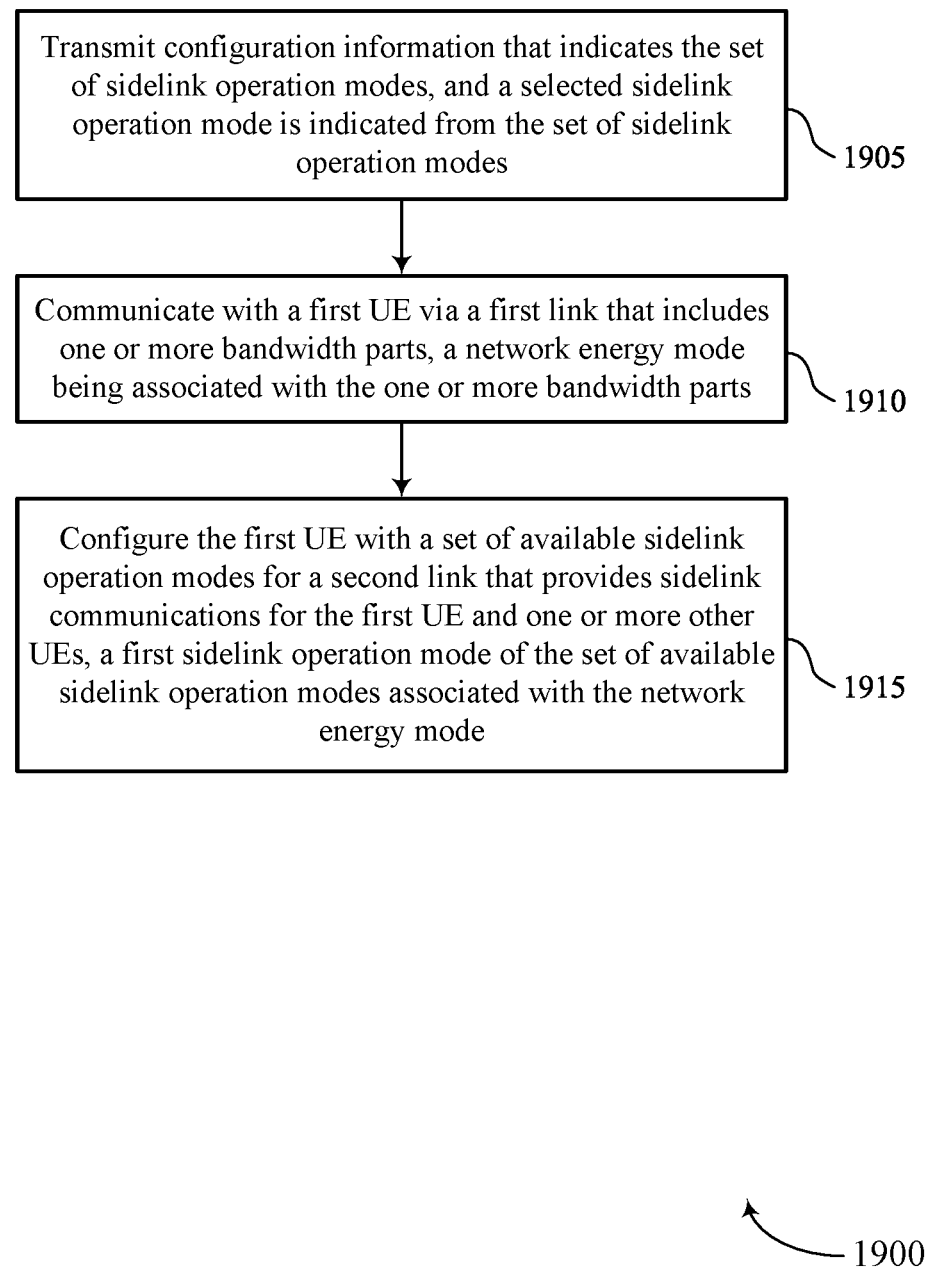

FIG. 19 illustrates a flowchart showing a method 1900 that supports sidelink communication techniques based on network link energy savings modes in accordance with one or more aspects of the present disclosure. The operations of the method 1900 may be implemented by a network entity or its components as described herein. For example, the operations of the method 1900 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1905, the method may include transmitting configuration information that indicates the set of sidelink operation modes, and a selected sidelink operation mode is indicated from the set of sidelink operation modes. The operations of 1905 may be performed in accordance with examples as disclosed herein. In some examples, aspects of the operations of 1905 may be performed by a configuration manager 1140 as described with reference to FIG. 11.

At 1910, the method may include communicating with a first UE via a first link that includes one or more bandwidth parts, a network energy mode being associated with the one or more bandwidth parts. The operations of 1910 may be performed in accordance with examples as disclosed herein. In some examples, aspects of the operations of 1910 may be performed by a network link manager 1125 as described with reference to FIG. 11.

At 1915, the method may include configuring the first UE with a set of available sidelink operation modes for a second link that provides sidelink communications for the first UE and one or more other UEs, a first sidelink operation mode of the set of available sidelink operation modes associated with the network energy mode. The operations of 1915 may be performed in accordance with examples as disclosed herein. In some examples, aspects of the operations of 1915 may be performed by a sidelink operation mode manager 1130 as described with reference to FIG. 11.

The following provides an overview of aspects of the present disclosure:

Aspect 1: A method for wireless communication at a UE, comprising: communicating with a network entity via a first link that includes one or more bandwidth parts, a network energy mode being associated with the one or more bandwidth parts; identifying a first sidelink operation mode of a set of available sidelink operation modes of a second link that provides sidelink communications with one or more other UEs, the first sidelink operation mode based at least in part on the network energy mode; and communicating with the one or more other UEs via the second link in accordance with the first sidelink operation mode.

Aspect 2: The method of aspect 1, wherein the identifying comprises: receiving an indication that a first bandwidth part is activated for communications on the first link, the first bandwidth part having an associated first network energy mode, and at least a second bandwidth part has an associated second network energy mode that is different than the first network energy mode; and identifying the first sidelink operation mode that is associated with the first network energy mode based at least in part on the activation of the first bandwidth part, and a second sidelink operation mode of the set of available sidelink operation modes is associated with the second network energy mode.

Aspect 3: The method of aspect 2, wherein the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

Aspect 4: The method of any of aspects 1 through 3, further comprising: receiving an indication that the first link has a changed bandwidth part that is associated with a different network energy mode; identifying a second sidelink operation mode of the set of available sidelink operation modes based at least in part on the changed bandwidth part; and communicating with the one or more other UEs via the second link in accordance with the second sidelink operation mode.

Aspect 5: The method of any of aspects 1 through 4, wherein a first bandwidth part of the one or more bandwidth parts indicates an energy saving mode associated with the first link, and a second bandwidth part of the one or more bandwidth parts indicates a regular network energy mode associated with the first link.

Aspect 6: The method of any of aspects 1 through 5, further comprising: receiving configuration information that indicates the one or more bandwidth parts of the first link and an associated sidelink operation mode of the set of sidelink operation modes for each of the one or more bandwidth parts.

Aspect 7: The method of aspect 6, wherein a first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications with the one or more UEs when the first link uses the first bandwidth part, and the second sidelink operation mode is used for sidelink communications with the one or more UEs when the first link uses the second bandwidth part.

Aspect 8: The method of aspect 7, wherein the receiving the configuration information comprises: receiving a first information element associated with the first bandwidth part that indicates a first network energy mode and the first sidelink operation mode; and receiving a second information element associated with the second bandwidth part that indicates a second network energy mode and the second sidelink operation mode.

Aspect 9: The method of any of aspects 1 through 8, further comprising: receiving configuration information that indicates the set of sidelink operation modes, and a selected sidelink operation mode is indicated from the set of sidelink operation modes.

Aspect 10: The method of aspect 9, wherein the selected sidelink operation mode is indicated with the configuration information, or is dynamically indicated with signaling that activates the bandwidth part for communications using the first link.

Aspect 11: The method of any of aspects 1 through 10, wherein the first link includes two or more component carriers, and wherein the first sidelink operation mode based at least in part on the network energy mode associated with the one or more bandwidth parts of a first component carrier of the two or more component carriers.

Aspect 12: The method of aspect 11, further comprising: receiving configuration information for the two or more component carriers, the configuration information indicating whether an associated component carrier is linked to the set of sidelink operation modes.

Aspect 13: The method of aspect 12, wherein the configuration information associated with each component carrier includes an information element with a Boolean value that indicates whether or not a corresponding component carrier is linked to the set of sidelink operation modes.

Aspect 14: A method for wireless communication at a network entity, comprising: communicating with a first UE via a first link that includes one or more bandwidth parts, a network energy mode being associated with the one or more bandwidth parts; and configuring the first UE with a set of available sidelink operation modes for a second link that provides sidelink communications for the first UE and one or more other UEs, a first sidelink operation mode of the set of available sidelink operation modes associated with the network energy mode.

Aspect 15: The method of aspect 14, further comprising: transmitting an indication that a first bandwidth part is activated for communications with the first UE on the first link, the first bandwidth part having an associated first network energy mode, and at least a second bandwidth part having an associated second network energy mode that is different than the first network energy mode, wherein the first sidelink operation mode is associated with the first network energy mode based at least in part on the activation of the first bandwidth part, and a second sidelink operation mode of the set of available sidelink operation modes is associated with the second network energy mode based at least in part on activation of the second bandwidth part.

Aspect 16: The method of aspect 15, wherein the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

Aspect 17: The method of any of aspects 14 through 16, further comprising: transmitting an indication to the first UE that the first link has a changed bandwidth part that is associated with a different network energy mode, wherein a second sidelink operation mode of the set of available sidelink operation modes is associated with the changed bandwidth part and sidelink communications via the second link are in accordance with the second sidelink operation mode responsive to the indication that the first link has the changed bandwidth part.

Aspect 18: The method of any of aspects 14 through 17, wherein a first bandwidth part of the one or more bandwidth parts indicates an energy saving mode associated with the first link, and a second bandwidth part of the one or more bandwidth parts indicates a regular network energy mode associated with the first link.

Aspect 19: The method of any of aspects 14 through 18, further comprising: transmitting configuration information to the first UE that indicates the one or more bandwidth parts of the first link and an associated sidelink operation mode of the set of sidelink operation modes for each of the one or more bandwidth parts.

Aspect 20: The method of aspect 19, wherein a first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications among the UEs when the first link uses the first bandwidth part, and the second sidelink operation mode is used for sidelink communications among the UEs when the first link uses the second bandwidth part.

Aspect 21: The method of any of aspects 14 through 20, further comprising: transmitting configuration information that indicates the set of sidelink operation modes, and a selected sidelink operation mode is indicated from the set of sidelink operation modes.

Aspect 22: The method of aspect 21, wherein the selected sidelink operation mode is indicated with the configuration information, or is dynamically indicated with signaling that activates the bandwidth part for communications using the first link.

Aspect 23: The method of any of aspects 14 through 22, wherein the first link includes two or more component carriers, and wherein the first sidelink operation mode based at least in part on the network energy mode associated with the one or more bandwidth parts of a first component carrier of the two or more component carriers.

Aspect 24: The method of aspect 23, further comprising: transmitting configuration information for the two or more component carriers, the configuration information indicating whether an associated component carrier is linked to the set of sidelink operation modes.

Aspect 25: An apparatus for wireless communication at a UE, comprising a processor; memory coupled with the processor; and instructions stored in the memory and executable by the processor to cause the apparatus to perform a method of any of aspects 1 through 13.

Aspect 26: An apparatus for wireless communication at a UE, comprising at least one means for performing a method of any of aspects 1 through 13.

Aspect 27: A non-transitory computer-readable medium storing code for wireless communication at a UE, the code comprising instructions executable by a processor to perform a method of any of aspects 1 through 13.

Aspect 28: An apparatus for wireless communication at a network entity, comprising a processor; memory coupled with the processor; and instructions stored in the memory and executable by the processor to cause the apparatus to perform a method of any of aspects 14 through 24.

Aspect 29: An apparatus for wireless communication at a network entity, comprising at least one means for performing a method of any of aspects 14 through 24.

Aspect 30: A non-transitory computer-readable medium storing code for wireless communication at a network entity, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving configuration information that indicates one or more bandwidth parts of a first link between the UE and a network entity and an associated sidelink operation mode of a set of available sidelink operation modes for each of the one or more bandwidth parts on a per-bandwidth part basis;
   communicating with the network entity via the first link that includes the one or more bandwidth parts, a network energy mode being associated with the one or more bandwidth parts;
   identifying a first sidelink operation mode of the set of available sidelink operation modes of a second link that provides sidelink communications with one or more other UEs, the first sidelink operation mode based at least in part on the network energy mode of a first bandwidth part of the second link and the associated sidelink operation mode of the set of available sidelink operation modes for the first bandwidth part; and
   communicating with the one or more other UEs via the second link in accordance with the first sidelink operation mode.

2. The method of claim 1, wherein the identifying comprises:
receiving an indication that the first bandwidth part is activated for communications on the first link, the first bandwidth part having an associated first network energy mode, and at least a second bandwidth part has an associated second network energy mode that is different than the first network energy mode; and
identifying the first sidelink operation mode that is associated with the first network energy mode based at least in part on the activation of the first bandwidth part, and a second sidelink operation mode of the set of available sidelink operation modes is associated with the second network energy mode.

3. The method of claim 2, wherein the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

4. The method of claim 1, further comprising:
receiving an indication that the first link has a changed bandwidth part that is associated with a different network energy mode;
identifying a second sidelink operation mode of the set of available sidelink operation modes based at least in part on the changed bandwidth part; and
communicating with the one or more other UEs via the second link in accordance with the second sidelink operation mode.

5. The method of claim 1, wherein the first bandwidth part of the one or more bandwidth parts indicates an energy saving mode associated with the first link, and a second bandwidth part of the one or more bandwidth parts indicates a regular network energy mode associated with the first link.

6. The method of claim 1, further comprising:
receiving configuration information that indicates the one or more bandwidth parts of the first link and an associated sidelink operation mode of the set of sidelink operation modes for each of the one or more bandwidth parts.

7. The method of claim 6, wherein the first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications with the one or more UEs when the first link uses the first bandwidth part, and the second sidelink operation mode is used for sidelink communications with the one or more UEs when the first link uses the second bandwidth part.

8. The method of claim 7, wherein the receiving the configuration information comprises:
receiving a first information element associated with the first bandwidth part that indicates a first network energy mode and the first sidelink operation mode; and
receiving a second information element associated with the second bandwidth part that indicates a second network energy mode and the second sidelink operation mode.

9. The method of claim 1, further comprising:
receiving configuration information that indicates the set of sidelink operation modes, and a selected sidelink operation mode is indicated from the set of sidelink operation modes.

10. The method of claim 9, wherein the selected sidelink operation mode is indicated with the configuration information, or is dynamically indicated with signaling that activates the bandwidth part for communications using the first link.

11. The method of claim 1, wherein the first link includes two or more component carriers, and wherein the first sidelink operation mode based at least in part on the network energy mode associated with the one or more bandwidth parts of a first component carrier of the two or more component carriers.

12. The method of claim 11, further comprising:
receiving configuration information for the two or more component carriers, the configuration information indicating whether an associated component carrier is linked to the set of sidelink operation modes.

13. The method of claim 12, wherein the configuration information associated with each component carrier includes an information element with a Boolean value that indicates whether or not a corresponding component carrier is linked to the set of sidelink operation modes.

14. A method for wireless communication at a network entity, comprising:
transmitting, to a first user equipment (UE), configuration information that indicates one or more bandwidth parts of a first link between the first UE and the network entity and an associated sidelink operation mode of a set of available sidelink operation modes for each of the one or more bandwidth parts on a per-bandwidth part basis;
communicating with the first UE via the first link that includes one or more bandwidth parts, a network energy mode being associated with the one or more bandwidth parts; and
configuring the first UE with the set of available sidelink operation modes for a second link that provides sidelink communications for the first UE and one or more other UEs, a first sidelink operation mode of the set of available sidelink operation modes associated with the network energy mode of a first bandwidth part of the second link and the associated sidelink operation mode of the set of available sidelink operation modes for the first bandwidth part.

15. The method of claim 14, further comprising:
transmitting an indication that the first bandwidth part is activated for communications with the first UE on the first link, the first bandwidth part having an associated first network energy mode, and at least a second bandwidth part having an associated second network energy mode that is different than the first network energy mode, wherein the first sidelink operation mode is associated with the first network energy mode based at least in part on the activation of the first bandwidth part, and a second sidelink operation mode of the set of available sidelink operation modes is associated with the second network energy mode based at least in part on activation of the second bandwidth part.

16. The method of claim 15, wherein the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

17. The method of claim 14, further comprising:
transmitting an indication to the first UE that the first link has a changed bandwidth part that is associated with a different network energy mode, wherein a second sidelink operation mode of the set of available sidelink operation modes is associated with the changed bandwidth part and sidelink communications via the second link are in accordance with the second sidelink operation mode responsive to the indication that the first link has the changed bandwidth part.

18. The method of claim 14, wherein the first bandwidth part of the one or more bandwidth parts indicates an energy saving mode associated with the first link, and a second bandwidth part of the one or more bandwidth parts indicates a regular network energy mode associated with the first link.

19. The method of claim 14, further comprising:
transmitting configuration information to the first UE that indicates the one or more bandwidth parts of the first link and an associated sidelink operation mode of the set of sidelink operation modes for each of the one or more bandwidth parts.

20. The method of claim 19, wherein the first bandwidth part of the one or more bandwidth parts is associated with the first sidelink operation mode and a second bandwidth part of the one or more bandwidth parts is associated with a second sidelink operation mode of the set of sidelink operation modes, and the first sidelink operation mode is used for sidelink communications among the UEs when the first link uses the first bandwidth part, and the second sidelink operation mode is used for sidelink communications among the UEs when the first link uses the second bandwidth part.

21. The method of claim 14, further comprising:
transmitting configuration information that indicates the set of sidelink operation modes, and a selected sidelink operation mode is indicated from the set of sidelink operation modes.

22. The method of claim 21, wherein the selected sidelink operation mode is indicated with the configuration information, or is dynamically indicated with signaling that activates the bandwidth part for communications using the first link.

23. The method of claim 14, wherein the first link includes two or more component carriers, and wherein the first sidelink operation mode based at least in part on the network energy mode associated with the one or more bandwidth parts of a first component carrier of the two or more component carriers.

24. The method of claim 23, further comprising:
transmitting configuration information for the two or more component carriers, the configuration information indicating whether an associated component carrier is linked to the set of sidelink operation modes.

25. An apparatus for wireless communication at a user equipment (UE), comprising:
one or more memories storing processor-executable code; and
one or more processors coupled with the one or more memories and individually or collectively operable to execute the code to cause the apparatus to:
receive configuration information that indicates one or more bandwidth parts of a first link between the UE and a network entity and an associated sidelink operation mode of a set of available sidelink operation modes for each of the one or more bandwidth parts on a per-bandwidth part basis;
communicate with the network entity via the first link that includes the one or more bandwidth parts, a network energy mode being associated with the one or more bandwidth parts;
identify a first sidelink operation mode of the set of available sidelink operation modes of a second link that provides sidelink communications with one or more other UEs, the first sidelink operation mode based at least in part on the network energy mode of a first bandwidth part of the second link and the associated sidelink operation mode of the set of available sidelink operation modes for the first bandwidth part; and
communicate with the one or more other UEs via the second link in accordance with the first sidelink operation mode.

26. The apparatus of claim 25, wherein to identify the first sidelink operation mode, the one or more processors are operable to cause the apparatus to:
receive an indication that the first bandwidth part is activated for communications on the first link, the first bandwidth part having an associated first network energy mode, and at least a second bandwidth part has an associated second network energy mode that is different than the first network energy mode; and
identify the first sidelink operation mode that is associated with the first network energy mode based at least in part on the activation of the first bandwidth part, and a second sidelink operation mode of the set of available sidelink operation modes is associated with the second network energy mode.

27. The apparatus of claim 26, wherein the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

28. An apparatus for wireless communication at a network entity, comprising:
one or more memories storing processor-executable code; and
one or more processors coupled with the one or more memories and individually or collectively operable to execute the code to cause the apparatus to:
transmit, to a first user equipment (UE), configuration information that indicates one or more bandwidth parts of a first link between the first UE and the network entity and an associated sidelink operation mode of a set of available sidelink operation modes for each of the one or more bandwidth parts on a per-bandwidth part basis;
communicate with the first UE via the first link that includes one or more bandwidth parts, a network energy mode being associated with the one or more bandwidth parts; and
configure the first UE with the set of available sidelink operation modes for a second link that provides sidelink communications for the first UE and one or more other UEs, a first sidelink operation mode of the set of available sidelink operation modes associated with the network energy mode of a first bandwidth part of the second link and the associated sidelink operation mode of the set of available sidelink operation modes for the first bandwidth part.

29. The apparatus of claim 28, wherein the one or more processors are individually or collectively further operable to execute the code executable by the processor to cause the apparatus to:
transmit an indication that the first bandwidth part is activated for communications with the first UE on the first link, the first bandwidth part having an associated first network energy mode, and at least a second bandwidth part having an associated second network energy mode that is different than the first network energy mode, wherein the first sidelink operation mode is associated with the first network energy mode based at least in part on the activation of the first bandwidth part, and a second sidelink operation mode of the set of available sidelink operation modes is associated with the second network energy mode based at least in part on activation of the second bandwidth part.

30. The apparatus of claim 29, wherein the first network energy mode indicates the first bandwidth part is a dormant bandwidth part or a network energy savings (NES) bandwidth part, and the first sidelink operation mode provides that sidelink communications are unchanged relative to other network energy modes, provides that sidelink communications are suspended while the first network energy mode is active, or provides that sidelink communications use sidelink resources allocated by sidelink devices while the first network energy mode is active.

* * * * *